June 15, 1965 H. F. WELSH ETAL 3,189,290

TAPE DRIVE AND RECORDING APPARATUS

Original Filed July 29, 1950 4 Sheets-Sheet 1

INVENTORS.
HERBERT FRAZER WELSH
LEON ROBERT MOCK
EDMUND D. SCHREINER
JOHN PRESPER ECKERT JR.

BY Fred Fisher
ATTORNEY

TAPE DRIVE AND RECORDING APPARATUS

Original Filed July 29, 1950 4 Sheets-Sheet 2

INVENTORS.
HERBERT FRAZER WELSH
LEON ROBERT MOCK
EDMUND D. SCHREINER
JOHN PRESPER ECKERT JR.
BY
ATTORNEY

TAPE DRIVE AND RECORDING APPARATUS

Original Filed July 29, 1950 4 Sheets-Sheet 3

INVENTORS.
HERBERT FRAZER WELSH
LEON ROBERT MOCK
EDMUND D. SCHREINER
JOHN PRESPER ECKERT JR.
BY
[signature]
ATTORNEY

TAPE DRIVE AND RECORDING APPARATUS

Original Filed July 29, 1950 4 Sheets-Sheet 4

INVENTORS.
HERBERT FRAZER WELSH
LEON ROBERT MOCK
BY EDMUND D. SCHREINER
JOHN PRESPER ECKERT JR.

ATTORNEY

United States Patent Office 3,189,290
Patented June 15, 1965

3,189,290
TAPE DRIVE AND RECORDING APPARATUS

Herbert Frazer Welsh, Philadelphia, Pa., and Edmund D. Schreiner, Port Washington, and Leon Robert Mock, Forest Hills, N.Y., and John Presper Eckert, Jr., Philadelphia, Pa., assignors to Sperry Rand Corporation, a corporation of Delaware Original application July 29, 1950, Ser. No. 176,722, now Patent No. 2,708,554, dated May 17, 1955. Divided and this application Apr. 6, 1955, Ser. No. 499,566
24 Claims. (Cl. 242—55.12)

Figure 1:
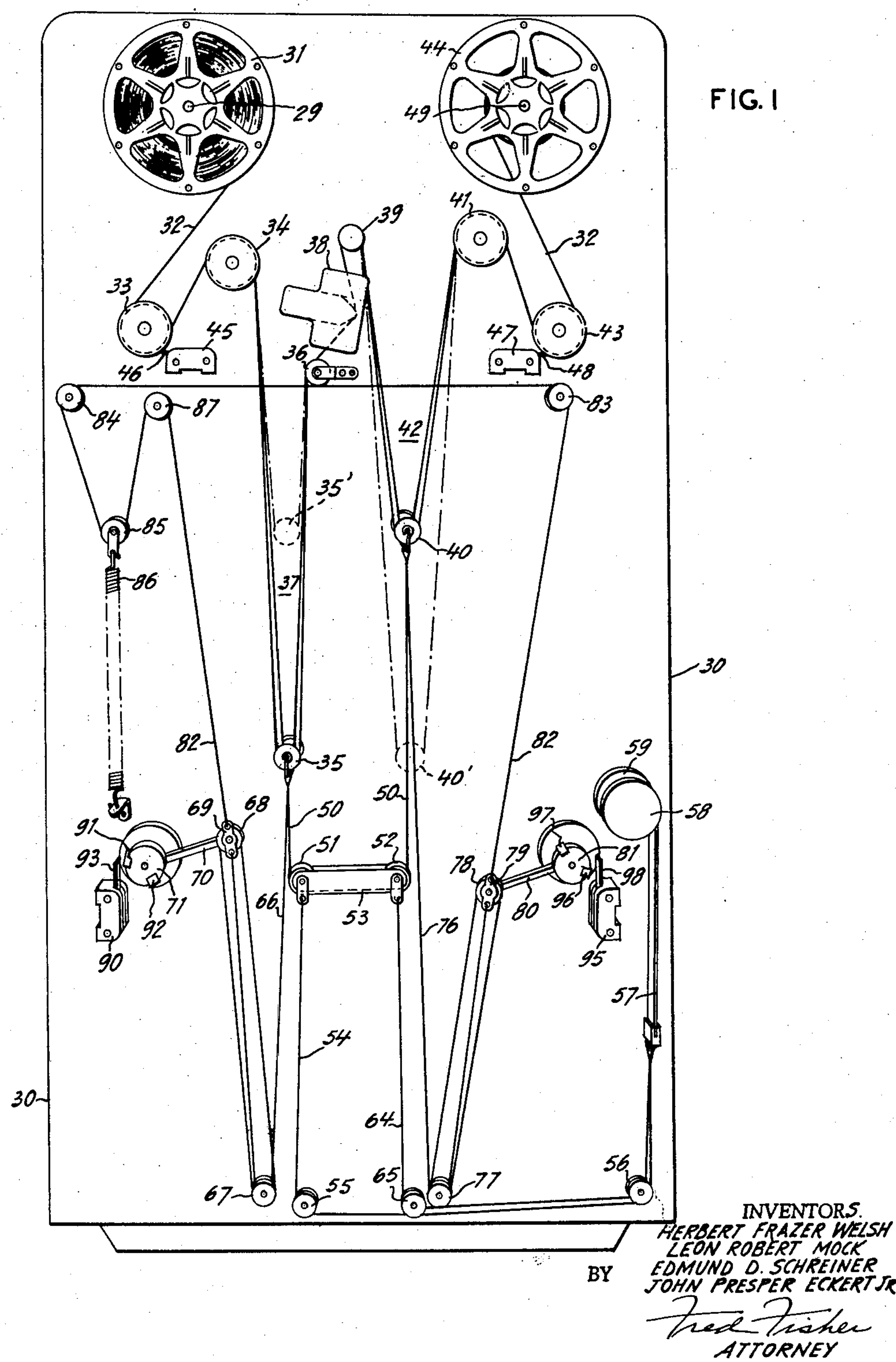

This application is a division of the copending application S.N. 176,722; filed on July 29, 1950, in the names of Herbert Frazer Welsh, Leon Robert Mock, Edmund D. Schreiner and John Presper Eckert, Jr.; entitled "Tape Drive and Recording Apparatus"; and issued as Patent 2,708,554 on May 17, 1955.

This invention relates to driving systems for flexible elongated members, and more particularly to a method of and apparatus for rapidly starting and stopping reading from a recording upon such members.

Realization of the potentialities of large scale, high speed digital computers requires economical and readily available storage systems for large quantities of digital information. The recordation of information upon a magnetically susceptible tape provides an efficient means of storing information. To maintain computer efficiency it is necessary that a tape driving apparatus be capable of receiving information in blocks, as it issues from the computer at a high rate of speed, starting and stopping between blocks. It is, therefore, essential that the tape be quickly accelerated to a desired recording speed from its inoperative state when information is available for recordation, and be decelerated equally rapidly at the end of the block. This is likewise necessary when the information is being delivered from a tape to a computer (reading).

In general, greater efficiency of operation can be effectuated by use of a highly versatile tape driving and recording apparatus for tape actuation in the forward, or backward directions while either recording or reproducing information, and also providing convenient and rapid tape rewind. The employment of a plurality of such tape driving and recording units capable of operating simultaneously to the extent of permitting the recordation of information by one unit while another is delivering recorded information and any number of other units are rewinding, not only provides a limitless information storage capacity, but enlarges the accessibility of recorded information while still further increasing information input-output capacity of the apparatus.

It is noted that the invention is not limited to the driving of magnetically susceptible tapes but includes all elongated flexible members. Neither is it intended that the scope of the invention be limited by its adaptation for use in computing apparatus.

Accordingly, it is a principal object of the invention to provide new and improved tape driving apparatus capable of rapidly attaining desired driving velocities adjacent a given location, especially when periodically actuated.

A further object of the invention is to provide a new and improved motor control system producing high acceleration rates for changing from one operating state or velocity to another while affording maximum controllability.

Another object of this invention is to provide a positive acting motor control sensing and control system for operation in any motor rotational position and in either direction.

Still a further object of the invention is to provide a new and improved signal input-output link selectively receiving signals from one source or delivering signals to another source effectively minimizing cross-talk and other spurious interference.

From a mechanical standpoint, the tape handling system includes take-up and supply reels, coupled to a high speed tape drive through slack loops. The high speed tape drive is capable of very rapid acceleration and deceleration, as it handles a relatively short length of very thin tape with very little mass. The high acceleration and deceleration rates cannot be matched by the more massive supply and take-up reels, so the slack loops are interposed to serve as tape reservoirs during the time required for the supply and take-up apparatus to come up to an equilibrium speed. The size of the slack loops is controlled by a loop sensing device acting through a servo network controlling the associated supply or take-up motor to maintain the slack loop within predetermined size limits. Provision is made for adjusting the size of the slack loops in anticipation of the expected sense of operation of the high speed tape drive, the loop associated with the supply reel being enlarged and the take-up loop diminished in size when the tape is to be driven in a forward direction, and conversely when the tape is to be driven in reverse, as during a rewind operation. Random migration of the tape between supply and take-up loops when the high speed tape drive is de-energized is avoided by the application of loop tension through an equalizer bar to prevent tension differentials on the two loops.

The high speed starting and stopping characteristics of the tape drive particularly adapt the device for recording and delivering information in short bursts with little waste of time. Realization of these advantages requires complementary design of the electrical control circuits to incorporate high speed relays and apply auxiliary starting power surges and motor plugging power. High speed starts are further facilitated by operating the tape drive motor at less than synchronous speed under the control of a speed governing servo systems. Delay is automatically provided when required for adjustment of the size of the slack loops.

Additional features of the invention permit a number of such devices to be connected to common control and information buses, with selection performed over a single group of individual conductors. Interlocking networks and component relationships prevent initiation of an operation in a given unit while it remains in the process of executing a previously started operation, or, optionally after rewinding, until manual correction of the interlock bar to further service. Availability for the next operation is signified by repeating back an interrogatory signal through clear indicating circuits. Safety shutdown is provided in the event of tape breakage or abnormal operation of most parts of the system.

Figure 2:
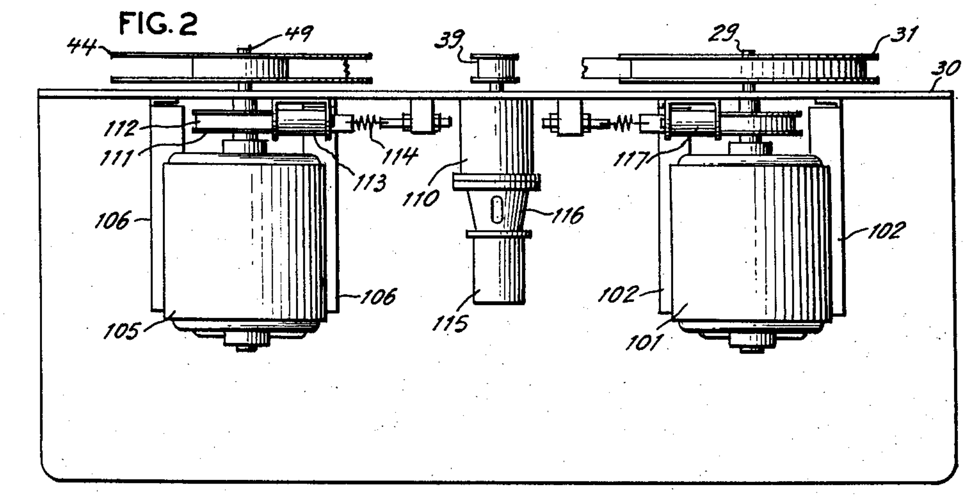
Figure 3:
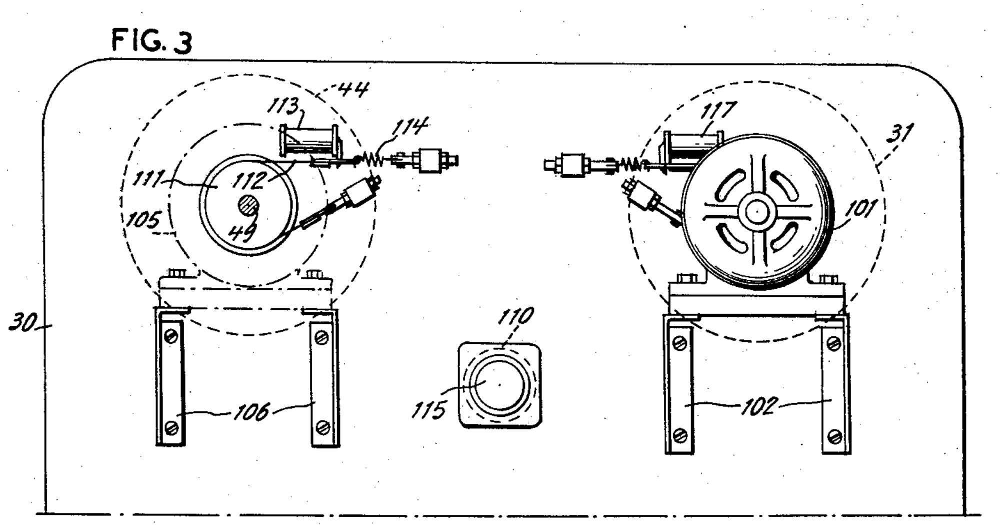
Figure 6:
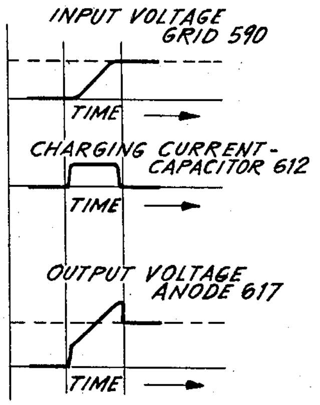
Figure 4:
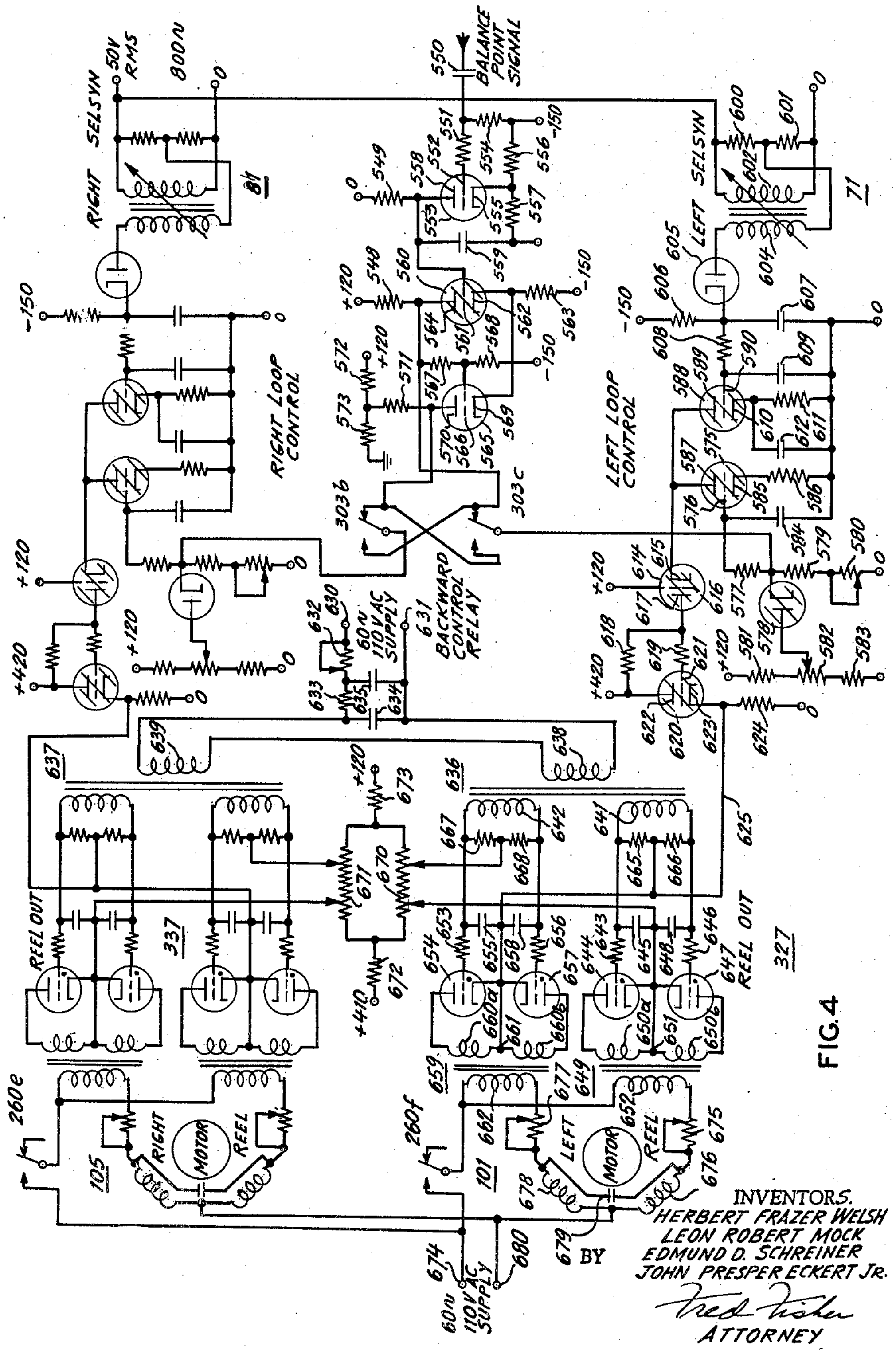
Figure 5:
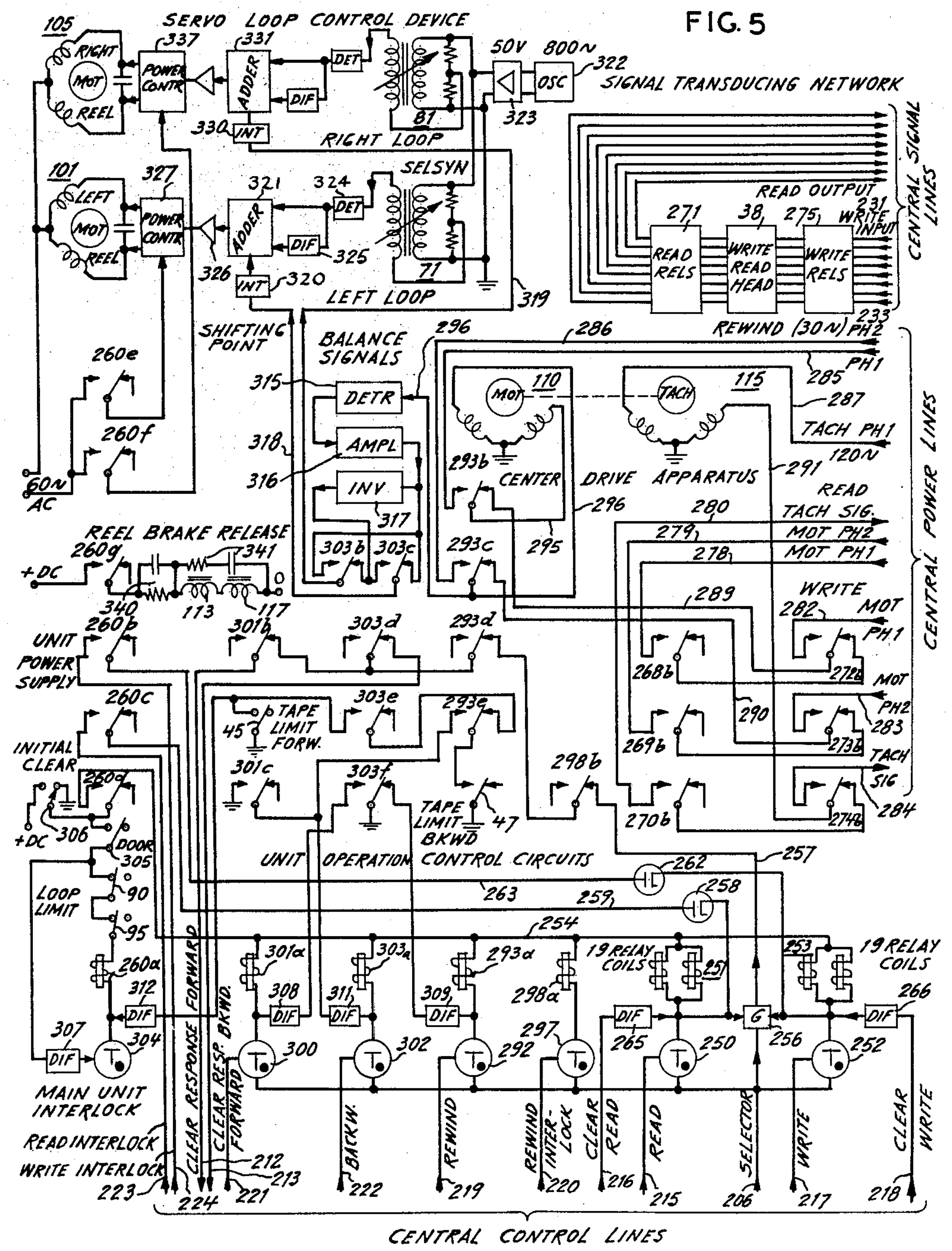

The above and further objects and aspects of the invention will become more apparent from the following detailed description taken in reference to the accompanying drawings in which:

FIGURE 1 is a front elevation view of a tape handling unit employed in the reading and writing process, FIGURE 2 is a plan view of the tape handling unit shown in FIGURE 1, FIGURE 3 is a rear elevation view of the upper portion of the tape handling unit shown in FIGURE 1, FIGURE 4 illustrates schematically the servo system controlling the tape supply and the take-up loops of the tape handling unit, FIGURE 5 illustrates diagrammatically local control circuits for a tape handling unit used for reading and writing, and FIGURE 6 illustrates graphically the signal voltages at selected locations in the loop control circuit of the servo device shown in FIGURE 4.

In the annexed drawings, like parts are identified by like reference characters and values of potential are given for purposes of illustration only and not in order to limit the scope of the invention. Heaters, heater circuits and power supplies, generally, have been omitted to promote simplicity, it being understood that any well known systems or circuits may be used for this purpose.

The general disposition of the tape handling elements in the apparatus is illustrated in FIGURE 1. A tape storage reel 31 is rotatably mounted upon a front panel 30 and bears a supply of tape 32 susceptible to magnetic recordation. The tape 32 leaving the supply reel 31 is threaded over a path including idler guide wheels 33, 34, loop tension pulley 35, head guide wheel 36, the read-write head 38, the center drive wheel 39, loop tension pulley 40, and idler guide wheels 41 and 43, the latter delivering the tape to the take-up reel 44, also rotatably mounted on the panel 30. The tape included between the idler guide wheels 34 and 36 forms a supply loop 37, while the tape included between the center drive wheel 39 and idler guide wheel 41 forms a take-up loop. The engaged face of the center drive wheel 39 is faced with material having a high coefficient of friction to better drive the tape. The idler guide pulleys 33, 34, 36, 41, and 43 are all mounted upon the front panel 30 to be freely rotatable about their axes. The idler guide wheel 33 is associated with a thickness responsive forward tape limit switch 45 having an arm 46 in engagement with the tape 32. A thickness responsive backward tape limit switch 47 having an arm 48 is associated in a like manner with the idler guide wheel 43. Referring briefly to FIGURE 2, it is seen that the tape storage reel 31 is mounted on the shaft of the reel motor 101, secured to the rear face of the panel 30. Likewise, the right tape storage reel 44 is mounted on and driven by the reel motor 105. The projecting shaft of a low inertia center drive motor 110 mounted on the rear of panel 30 bears the center drive wheel 39.

Referring now to FIGURE 1, the pulley blocks of the loop tension pulleys 35 and 40 are joined by an equalizer cord 50 which passes around a pair of equalizer bar pulley wheels 51 and 52 which are spaced by and supported at the extremities of an equalizer bar 53, so that the loop tension pulleys 35 and 40 may move relative to each other, one moving upward when the other is moving downward, while permitting the equalizer bar 53 to remain stationary with relation to the front panel 30. The end of the equalizer bar 53 rotatably supporting the pulley 51 is connected to a tension cord 54 which passes over the outboard wheels of the double tension cord pulleys 55, 65, and 56 to connect to the end 57 of a main tension spring of the constant rate type which has a remaining portion 59 coiled about a mainspring idler wheel 58. The other extremity of the equalizer bar 53 supporting the pulley 52 is likewise joined by a tension cord 64 to the end 57 of the main tension spring, extending around the inboard wheels of the double tension cord pulleys 65 and 56. The main tension spring exerts equal force upon both extremities of the equalizer bar 53 through the tension cords 54 and 64 maintaining the equalizer bar in a horizontal position and also tensioning the equalizer cord 50 passing around the bar pulleys 51 and 52. The equalizer cord in turn exerts equal tensioning force upon the loop tensioning pulleys 35 and 40, any tensional difference being equalized by the motion of the equalizer cord around the equalizer bar pulleys 51 and 52. Thus, equal tensional force is exerted upon the tape loop 37 and tape loop 42 by the loop tensioning pulleys 35 and 40, respectively, through the action of the equalizer cord 50, said tensional force also being maintained constant by downward or upward motion of the equalizer bar 53 under the influence of the main tensioning spring, exerted through the tension cords 54 and 64. It should be observed that motion of the equalizer bar 53 in the upward or downward direction occurs only when the motion of one of the loop tensioning pulleys 35 or 40 is not complemented by an opposite and equal motion of the other loop tensioning pulley. For example, if the loop tension pulley 35 maintains the solid line position of FIGURE 1 and the loop tension pulley 40 moves to the dashed line position 40′, the equalizer bar 53 will move in a downward direction a distance equal to half the distance travelled by the loop tension pulley 40 to its new position 40′. This shows that the equalizer bar 53 will move only upon occasion of unequal motions of the loop tension pulleys 35 and 40, such resulting motion being only one-half the unequal motion of said pulleys and in the direction of such inequality. Normally, pulleys 35 and 40 move in a complementary manner, leaving the position of equalizer bar 53 unchanged. Obviously, under these conditions, the equalizer bar, which affords a point of connection for the establishment of tension, contributes no additional inertia to the moving system. Even when the motion is not complementary the reduced motion of the equalizer bar greatly reduces the inertia reflected into the moving system. The use of the equalizer bar 53 with its associated pulleys 51 and 52 has been found of great advantage over the use of a simple pulley by its contribution to better operating characteristics and stability, minimizing undue vibration and undesirable undulations.

The self-synchronous transformers 71 and 81 serve as a pair of loop position sensing units and are individually associated with a servo loop control device to be later described in detail. These units are respectively coupled to the pulley blocks of the loop tension pulleys 35 and 40. The loop position sensing unit 71 is actuated by a cord 66 connected to the block of loop tension pulley 35 through a three-to-one reduction pulley system including a pulley 67 secured to the panel 30 and a pulley 68 secured to the end of the arm 70 of the selsyn 71. The motion of the selsyn pulley 68 is, therefore, only one-third as great as the corresponding motion of its associated loop tension pulley. The arm 80 of the selsyn 81 is joined to the loop tension pulley 40 in a manner similar to that just described by means of cord 76 through selsyn pulley 78 and reduction pulley 77 effecting a like reduction ratio.

Restoring force is applied to the selsyn arms 70 and 80 by a cord 82 connecting the two and passing over the idler pulleys 83, 84, and 87, rotatably mounted on the panel 30, and maintained under tension by the action of a spring 86 anchored at one end to the panel 30 and provided at its other end with a tension pulley 85 riding on the cord 82.

The pulley reduction system driving the selsyn arms reduces the arm motion for a given displacement of the loop tension pulleys 35 and 40, and delivers a greater actuating force to said arms 70 and 80, thereby reducing the effective mass associated with the loop tension pulleys 35 and 40 connected thereto through cords 66 and 76 respectively. The tension exerted by the cord 82 upon the blocks 69 and 79 of selsyn pulleys 68 and 78 causes the arms 70 and 80 to follow the positions of the respective loop tension pulleys 35, 40. This force is reduced on transmission to the the loop tension pulleys 35 and 40 through the associated reduction system. The force on each pulley is equal, avoiding system unbalance. Obviously, after the three-fold reduction, the auxiliary force exerted by the cord 82 is small by comparison with the tension developed at the loop pulleys 35, 40 by the main tension spring 57.

The selsyn 71 has associated therewith a supply loop limiting switch 90 having an arm 93 actuated by limit cams 91 and 92 driven from the selsyn arms 70. Thus, if the loop tension pulley 35 were to continue to move downward, the selsyn arm 70 would rotate counterclockwise bringing the limit cam 91 to a position actuating the arm 93 of the limit switch 90. The operation of the limit switch 90 upon actuation of the arm 93 will later be described in detail. The limit cam 92 actuates arm 93 when the loop tension pulley 35 moves upwardly beyond the position indicated by 35'. Only under abnormal conditions will the loop tension pulley 35 move to the extreme positions actuating the loop limit switch 90. The normal operating range of said loop tension pulley 35 is between the extremes indicated.

A take-up loop limit switch 95 having an arm 98 is actuated by the limit cams 96 and 97 associated with the selsyn 81 and driven by the selsyn arm 80 which is responsive to the position of the loop tension pulley 40 and operates in similar fashion. Thus, if the loop tension pulley 40 moves upward from the position shown, the selsyn arm 80 rotates counterclockwise, causing the actuation of the limit switch 95 by the limit cam 96. The limit switch 95 also operates when the loop tension pulley 40 moves downward beyond the position 40' indicated by dashed lines, actuation of the switch 95 being affected by the limit cam 97 in this case. The limit switches 90, 95, as apparent from the drawing in FIGURE 1, operate independently of each other and are actuated when their respective loop tension pulleys assume positions beyond their normal operating positions.

To describe the operation of the tape handling apparatus of the read-write unit, it should first be noted that the tension exerted upon the loop tensioning pulleys 35 and 40 being equal, there will be no tendency of the tape 32 to move from one loop 37 to the other loop 42, or in the opposite direction, to equalize unequal tensions, which would rotate the center drive wheel 39. Thus, it is apparent that no translation of tape 32 can be effected from one loop to the other except upon displacement of tape 32 by the center drive wheel 39. This effect is very desirable because tape is only to be moved over the read-write head 38 when tape is displaced by powered rotation of center drive wheel 39. The tensioning of the loops 37 and 42 also serves to maintain the tape 32 in good contact with the center drive wheel 39 and the read-write head 38. This tension, if excessive, results in increased tape wear and friction, which should be avoided.

It is thus apparent that, when the center drive wheel 39 is inactive, the only manner in which the loops 37 and 42 may have their size varied is by having tape 32 added thereto or removed therefrom by the corresponding tape storage reel 31 and 44, respectively. Assuming now that the tape handling system is to operate in a forward direction, that is, with tape being supplied by the tape storage reel 31 and taken up by the tape storage reel 44, the loops 37 and 42 are adjusted to assume positions substantially as shown in FIGURE 1 before the center drive wheel 39 is actuated. The solid line position of the loop tension pulleys 35 and 40 is assumed whenever the tape is to be driven in the forward direction. A corresponding, but mirror image, position is assumed by the loop tension pulleys 35 and 40 prior to tape actuation by the center drive wheel 39 in the backward direction when the tape is to be driven in the opposite or backward direction. This point position is indicated by pulley positions 35' and 40'. It should be noted that the loop tension pulleys 35 and 40 may be shifted from one of these positions to the other without the least motion of the equalizer bar 53, as the tape transfer is complementary.

Inasmuch as the size of the tape take-up and supply loops is governed in the completed apparatus by a self-balancing servo system, and the respective tape loop positions illustrated correspond to balanced conditions in the associated servo system when set for forward and reverse drive, they may be referred to as the forward balance point position (solid line) and the reverse balance point position (dashed line).

If, with the loop tension pulleys 35 and 40 in the forward balance point position, the center drive wheel 39 is actuated in the forward or clockwise direction, assuming its steady state rotational velocity in the short period of time corresponding to a high accelerating rate, tape is removed from the left loop 37 at a greater rate than it is replaced, causing this loop to diminish in size, whereas tape is delivered to the right loop 42 at a greater rate than it is removed so that this loop is increased in size. The difference between the performance of the center drive and the supply reels is a result of the different starting characteristics of the two systems, arising from the different inertias involved. Upon the actuation of the center drive wheel 39, tape is supplied to the left loop 37 by the tape storage reel 31 under the control of the servo system. However, the initial rate of such supply is lower than the rate of tape removal from said loop 37 by the center drive wheel 39. At the same time, the storage reel 44 removes tape from the right loop 42, the initial rate of removal being lower than the rate at which tape is supplied to the loop 42 by the center drive wheel 39. Because of this, immediately upon the actuation of the center drive wheel 39, the loop 37 decreases while loop 42 increases in size, such increase and decrease continuing while the supply motors accelerate until the loop tension pulleys 35 and 40 assume the second balance point position indicated by 35' and 40', by which time the tape storage reel 31 is supplying tape at a rate equal to its removal by the center drive wheel 39 and the tape storage reel 44 is removing tape from the loop 42 at a rate equal to its supply by the center drive wheel 39. This balance point position is maintained by the pulleys 35 and 40 as long as the center drive wheel continues in its forward direction, without deceleration. During deceleration of the center drive wheel 39, the loop 37 enlarges in size while the loop 42 becomes smaller, so that the first balance point position is resumed by the loop tension pulleys 35 and 40 when the center drive wheel 39 stops, after which the supply reel servo system halts the supply reels.

From the preceding operative description, it is apparent that the loops 37 and 42 function as tape storage loops isolating the slowly accelerating tape supply system from the rapidly accelerating center drive. By this method the center drive wheel 39 having a high accelerating rate may be supplied with tape by means having a much lower tape supply accelerating rate. Acceleration and deceleration of the tape storage reels 31 and 44 must be limited to a lower rate because the mass of such a unit storing a large quantity of tape would require objectionably high torque to accelerate it at the same rate at which the low inertia type center drive wheel 39 is accelerated. Further, the forces involved in such high acceleration rates for the storage reels might damage the tape by cinching or unreeling. By using the loops 37 and 42 a longer period of time is made available for the acceleration of the reels 31 and 44 to achieve a tape delivery or take-up rate corresponding to the speed of the center drive wheel 39. It should be further noted that by positioning the loops 37 and 42 for driving in the forward direction in the manner indicated in FIGURE 1, so that loop 37 is initially larger than loop 42 instead of making them equal to each other, the respective storage capacities of said loops are enhanced for operation in the forward direction, doubling their efficiency. For operation in the backward direction, a high efficiency is achieved by positioning loop tensioning pulleys 35 and 40 in the dashed line positions 35' and 40', respectively, so that loop 42 is initially larger than tape loop 37, when the tape is to be driven in a backward direction. Thus, when operating in the backward direction the tape loop 42 decreases in size while the tape loop 37 increases in size after the center drive is energized until the other balance point position is assumed for steady state backward drive.

Another characteristic of operation should be noted in that, when the center drive wheel 39 is intermittently accelerated and decelerated, the periods of time involved may be so small that loop tensioning pulleys 35 and 40 do not assume the final positions for steady state operation or resume their initial position after a period of deceleration.

Upon such circumstances the pulleys 35 and 40 will assume positions intermediate their initial positions and their steady state operating position. For example, with a fifty-fifty work cycle, the loop tension pulleys 35 and 40 may assume positions halfway between the initial and steady state positions. Thus, the loop sizes will be maintained at an average size corresponding to the duty cycle and periods of operation involved. The operation of the system under such circumstances, whereby an average position is assumed by the loop tension pulleys 35 and 40, maximizes efficiently and helps to minimize vibrations, oscillations, and system instability.

The FIGURES 2 and 3 show the reel motors 101 and 105 respectively supported by brackets 102 and 106 attached to the rear surface of the front panel 30, FIGURE 3 not showing the motor 105 to better illustrate a safety braking system. Each of said motors has associated therewith a reel brake. The brake system for motor 105 comprises a brake drum 111 affixed to the motor drive shaft 49 of the right reel motor 105, a brake band 112 extending around the periphery of said brake drum 111 having one end anchored to the panel and the other end connected to a band tensioning spring 114 which urges the brake band 112 into engagement with the brake drum 111 and a brake band actuator 113. Under these conditions, sufficient frictional force is obtainable for securing the desired braking action of the tape storage reel 44 and reel drive motor 105. When energized, the actuator 113 exerts a force opposing the brake band tensioning spring 114 and reduces the friction between the brake band 112 and the brake drum 111. Thus, driving power may be applied to the tape storage reel 44 by the tape drive motor 105 when the actuator 113 is energized. It is to be noted that when the actuator 113 is de-energized, the braking action of the band 112 most effectively retards rotation of the tape storage reel 44 in the tape reeling out direction, because in this case the brake drum 111 exerts a force upon the anchored end of brake band 112, not the movable end. This distinction is important because best braking is required when the reel has been actuated in the reeling out direction, to prevent the accidental unreeling of large quantities of tape in case of a failure. A like braking system with similar features is provided for the left reel drive motor 101, which need not be described in detail because of its similarity of construction and operation with the safety brake associated with tape drive motor 105.

FIGURES 2 and 3 also illustrate the low inertia center drive motor 110 mounted on the rear surface of the front panel 30. The center drive motor 110 also drives a speed controlled signal generator or tachometer 115 mounted concentrically with and to the rear of said center drive motor 110, by coupling bracket 116 attached to the end of said center drive motor 110. The function of the tachometer 115 with relation to the center drive motor 110 will be explained in greater detail later, as well as the electrical operation of the reel drive motors 101 and 105 with respect to each other, and as related to the operation of the center drive motor 110.

The power control section of the central control device is activated by the operation control section, for controlling the delivery of power by a central power supplying apparatus connecting with each of the read-write units. The power supply to each read-write unit is for the purpose of actuating the center drive motor for causing forward drive, backward drive, and rewind drive. The power control functions of the central control device can be appreciated, if, it is remembered that a read-write unit must assume a balance point position corresponding to the direction of tape drive, before center driving is initiated, which corresponds to one position for a forward operation and another balance point position for a backward, rewind, and rewind-interlock operation. Therefore, if a read-write unit has been performing a forward operation, the balance point must be shifted if a backward, rewind, or rewind-interlock operation is to be performed thereafter. Because this shifting process from one balance point to another involves a period of time, center drive power cannot be applied until sufficient time has elapsed to permit the completion of a balance point shifting. For example, if the read-write unit had its operation control circuits set up to perform a forward operation and a backward operation is to be performed subsequently by this unit, the unit selector control is first caused to energize his particular read-write unit. If the read-write unit is in condition to perform a new operation, it will deliver a response to the central control device as previously explained. The fact that the read-write unit is set up for forward operation will be indicated by the fact that the response will be a clear response backward signal on the response line. The central control device upon receiving this signal and an operation instruction, in this case a backward instruction such as backward read or backward write, the corresponding central signal lines will be energized to set up the unit operation control circuits of the selected read-write unit to perform the indicated operation. The power control section of the central control device will delay delivery of power by the central power supply apparatus to the center drive apparatus of the read-write unit to allow time for a servo loop control device to shift the tape loops from the forward operation balance point to the backward operation balance point before center drive actuation. A similar delay would be occasioned if a rewind or rewind-interlock operation is to be initiated, for in that event the tape is also driven in the backward direction.

FIGURE 5 illustrates diagrammatically a read-write unit. All relays are shown in their de-energized positions. The portion of the local control circuits controlling read and write operations will be considered first. The read line 215 and the write line 217 of the central control lines connect, respectively, to a read thyratron 250 and a write thyratron 252. Both thyratrons are conditioned by connection to the selector line 206. If a read signal appears upon the line 215 when the selector line 206 is energized, the read thyratron 250 will become conductive causing current flow through the coils of nineteen read relays 251, connected between the read thyraton 250 and a positive D.C. voltage bus 254. Similarly, a signal upon the write line 217 when the selector line 206 is energized fires the write thyratron 252, which is associated with a plurality of write relays having nineteen coils connected between the thyratron 252 and the voltage bus 254. The relay coils and relay contacting members are shown in FIGURE 5 in a vertical column above the respective read or write thyratrons 250, 252. For example, the read relay contacting members associated with the read thyratron 250 are seen to be the read relay contacting groups 268*b*, 269*b*, 270*b* for delivering power from the central power lines to the center drive apparatus and the read relays 271 for delivering signals from the read-write head 38 to the read output lines 231 of the central signal lines. Likewise, the relay contacting groups associated with the write thyratron 252 may be seen to be the write relay contacting members 272*b*, 273*b*, 274*b* for delivering write central power from the central power lines to the center drive apparatus and write relays 275 for delivering signals on the write input lines 233 of the central signal lines to the read-write head 38.

A response gate 256 is also connected to the selector line 206 as well as to the read thyratron 250 and the write thyratron 252. The response gate 256 delivers a signal to the response line 257 only when a selector signal is present and neither read thyratron 250 nor the write thyratron 252 is conductive, so that the response line 257 is not energized when a selector signal is not present or either of the read or write thyratrons is conducting.

The read interlock diode 258 and a write interlock diode 262 have their cathodes respectively connected to the read thyratron 250 and the write thyratron 252 and their anodes respectively connected to lines 259 and 263. The line 259 is returned to the read-interlock line 223 through the relay contacting group 260*c* of a main unit interlock relay 260 such that disconnection results when the main unit interlock relay is de-energized. The line 263 is also joined by means of a relay contacting group 260*b* of the main unit interlock relay 260 to the write interlock relay line 224, which circuit is effectuated only when the said relay 260 is energized.

In operation the read interlock line 223 is returned to a lower potential through the read interlock diode 258 after the read thyratron 250 is fired. If the write thyratron 252 is fired preparatory to the performance of a write operation the write interlock line 224 is returned to a lowered potential by means of the write interlock diode 262. Because the interlock lines 223 and 224 are connected through the relay contacting groups 260*b*, 260*c*, said lines are returned to such lowered potential only when the main unit interlock relay is energized. This is significant in consideration of the fact that the purpose of returning the interlock lines 223, 224 to a lowered potential is for disabling the initiation of a read or write operation proceeding concurrently with another such operation, it is desirable that such interlocking should not be affected by a unit which has been made inoperative by the removal of power therefrom by the action of the main unit interlock, because of unit failure or some other cause. Thus, with the failure of a read-write unit the read interlock and write interlock lines 223 and 224 of the central control lines are not affected thereby and operations may be continued by the other read-write units.

A differentiator 265 connected with the read thyratron 250 receives signals from the clear read line 216 for the purpose of extinguishing the read thyratron 250, which may previously have been fired. A similar differentiator 266 connecting with the clear write line 218 acts to extinguish the write thyratron 252, if it is conducting when a clear write signal is delivered by the line 218. For example, if the read thyratron 250 is conducting, the response gate 256 may be placed in condition to respond to a selector signal only after the read thyratron 250 has been extinguished by receipt of a clear read signal over the line 216. At the same time the read interlock line 223 which was maintained at a lower potential while the read thyratron 250 was conducting experiences a voltage rise to allow the initiation of a new read operation; this will subsequently be explained in greater detail. This mode of operation just explained for the read thyratron holds true in a respective manner when considered in relation to the write thyratron 252.

Considering the read relays 271 and write relays 275 associated with the signal transducing network and actuated respectively by the read thyratron 250 and the write thyratron 252, it is observed that the read output lines 231 which comprise eight channels are connected to the read-write head 38 of the read-write unit for delivery of signals to the central signal lines upon the firing of the read thyratron 250. Likewise, the write input lines 233, comprising eight channels, delivers signals from the central signal lines to the read-write head 38 through the write relays 275 when they are actuated by the firing of the write thyratron 252. A suitable read-write head 38 is disclosed in U.S. patent application Serial No. 105,204 filed July 16, 1949, by the applicants, John Presper Eckert, Jr., and Leon Robert Mock, now U.S. Patent No. 2,618,709, issued Nov. 18, 1952. Referring to the relay contacting groups used for delivering power to the center drive apparatus, read relay contacting groups 268*b*, 269*b*, 270*b*, are energized by the read thyratron 250; write relay contacting groups 272*b*, 273*b*, 274*b* are energized by the write thyratron 252; and rewind relay containing groups 293*b*, and 293*c*, not previously considered, are energized by the relay coil 293*a*. Coil 293*a* connects with a rewind thyratron 292 which is joined with the rewind line 219 and the selector line 206. The rewind thyratron 292 is fired by receiving a rewind signal on the rewind line 219 when the selector line 206 is energized, causing activation of the rewind relay contacting groups 293*b* and 293*c*.

Considering now the completion of central power line circuits to the center drive apparatus for the purpose of supplying central power, a motor phase one line 278, a motor phase two line 279, and a tachometer signal line 280 are connected respectively to the lefthand contacting member of the read relay contacting groups 268*b*, 269*b*, and 270*b*. These groups are shown with their armatures in de-active positon contacting the right-hand contacting members.

The central power lines derived from the write power supply of the central power-supplying apparatus comprise a motor phase one line 282, a motor phase two line 283, and a tachometer signal line 284, and are connected to the left-hand contacting members of the write relay contacting groups 272*b*, 273*b* and 274*b* respectively. The right-hand contacting members of these groups respectively connect to the armatures of the read contacting groups 268*b*, 269*b*, and 270*b*.

The central power lines deriving power from the rewind power supply 237 comprise a rewind phase one line 285 and a rewind phase two line 286, which respectively connect to the left-hand contacting members of the relay contacting groups 293*b*, and 293*c*. The right-hand contacting members of groups 293*b* and 293*c* are joined respectively through the lines 289, 290, to the armatures of the contacting groups 272*b* and 273*b*. The armature of contacting group 293*b* is connected to the winding of the center drive motor 110 receiving phase one power. The armature of the relay contacting group 293*c* is joined by means of line 296 to the winding of the center drive motor 110 receiving phase two power, which is returned to ground potential with the phase one winding. The armature of relay contacting group 274*b* connects by means of a line 291 to a signal pickup winding of the tachometer 115, which winding has its other end returned to ground. Another winding of the tachometer 115 also returned to ground receives a signal voltage of 120 cycles per second over a tachometer phase one line 287 derived from the central power-supplying apparatus.

The center drive motor 110 is a low inertia type servo motor capable of high accelerating rates. Said motor 110 operates on the induction principle and has two energy-receiving coils which receive two-phase power. The power delivered to the windings of the center drive motor 110 is of a chosen frequency which minimizes the starting time required and is not necessarily the frequency at which the maximum torque is delivered by the motor 110. The operating speed of the motor 110 is below its synchronous speed which is determined by the frequency of the power delivered to the motor windings. The power delivered to the motor windings controls the motor speed in a manner which will be described below in greater detail.

The tachometer 115, which is mechanically coupled to the center drive motor 110 for synchronous rotation therewith, has a tachometer phase one signal delivered to one of its windings. An output signal is produced on its second winding, which has an amplitude directly related to the rotational speed of the tachometer armature, the signal output increasing with the speed of the center drive motor 110. However, the output signal frequency is the same as the input signal frequency (120 cycles per second) while the amplitude of the output signal varies with tachometer speed, said output signal being negligible when the tachometer is motionless. The tachometer output signal is either in or out of phase with the input from line 287, depending upon the direction of rotation.

If all the relays associated with the center drive apparatus have their armatures in the de-energized position as shown in FIGURE 5, neither read, nor write, nor rewind power may be delivered to the center drive apparatus. The tachometer signal line 280 and also tachometer signal line 284 are also disconnected from the center drive apparatus. Upon the actuation of the armatures of the read relay contacting groups 268*b*, 269*b*, and 270*b* (by firing the read thyratron 250) the read lines 278, 279, and 280 are operatively connected with the center drive apparatus. For instance, the motor phase one line 278 completes its circuit through the actuated read relay contacting group 268*b* passing through the armature thereof to the right contacting member of the write relay contacting group 272*b*, and through the armature thereof to the line 289; from line 289 to the right contacting member of the de-energized rewind relay contacting group 293*b*, and through the armature thereof over the line 295 to the phase one winding of the center drive motor 110. Motor 110 has its phase two winding operatively connected to the motor phase two line 279 in a similar manner. The read tachometer signal line 280 completes its circuit by passing through the armature of the read relay contacting group 270*b* to the right-hand contacting member of the de-energized write relay contacting group 274*b*, and through the armature thereof to the signal output winding of the tachometer 115. Tachometer 115 has its other winding directly energized by the tachometer phase one line 287. At this time it will suffice to know that the tachometer signal derived from the output winding of the tachometer 115 is returned to the central power-supplying apparatus for the purpose of effecting servo control of the center drive motor 110.

When the write thyratron is conductive, the write relay contacting groups 272*b*, 273*b*, and 274*b* are energized to operatively connect the write lines 282, 283, and 284 respectively with the center drive apparatus. For example, the motor phase one line 282 linked to the left-hand contacting member of the write relay contacting group 272*b* has its circuit completed by passing through the armature thereof, through the line 289 to the right-hand contacting member of the de-energized rewind relay contacting group 293*b*, passing through the armature thereof to the line 295 joining the phase one winding of the center drive motor 110. Motor 110 now has its other winding operatively connected in a like manner to the motor phase two line 283. The write tachometer signal line 284 is directly joined to the output signal winding of the tachometer 115 through the left-hand contacting member of the now energized write relay contacting group 274*b* through the armature thereof and the line 291. It is again noted that while the concurrent actuation of the read relays 251 and the write relays 253 is not normally possible, should such an abnormality occur, the write center power line will predominate over the read center power lines as do the write input lines 233 predominate over the read output lines 231 with respect to the central signal lines previously considered.

It should be remembered that the completion of circuits, such as by the connection of write power lines to the center drive apparatus upon the firing of the write thyratron 252, or the connection of read power lines upon the firing of the read thyratron 250, does not per se result in delivery of power to the center drive apparatus, as such delivery is further controlled by the central control device 211.

Rewind power from the rewind power supply 237 of the central power-supplying apparatus is delivered to the center drive motor 110 by the rewind phase one line 285 and rewind phase two line 286, when the rewind relay contacting groups 293*b* and 293*c* are energized by the firing and conduction of rewind thyratron 292. When the rewind thyratron 292 is conductive, the phase one and phase two power on the rewind lines 285 and 286, respectively, is delivered to the phase one winding and the phase two winding of the center drive motor 110 by passing from the left-hand contacting members through the armatures of the respective energized rewind relay contacting groups 293*b* and 293*c* through the lines 295 and 296. Unlike read or write power, rewind power is always present upon the lines 285, 286, so that rewind power is immediately supplied to the center drive motor 110 upon the actuation of the rewind relay 293. The speed of the center drive motor 110 is not controlled for purpose of rewind operation by varying the amplitude of the alternating current power signal delivered. The center drive motor 110 is allowed to operate at synchronous speed; the rewind power frequency is chosen so that the center drive motor 110 rewinds at a desired speed. Therefore, in the instant case, a rewind power frequency of 30 cycles per second is used, whereas the frequency used in performing a read or write operation, as previously explained, is chosen to minimize center drive motor starting time and is 120 cycles per second. It may be noted that a rewind operation will override both a read or write operation. However, such a condition is abnormal for, as it shall be seen later, a rewind operation cannot be initiated by a read-write unit performing a read or write operation, with the result that the rewind thyratron 292 may not be fired when either read thyratron 250 or write thyratron 252 is fired, nor may more than one of the rewind, read, or write thyratrons be conductive at one time under normal operating conditions.

A rewind interlock thyratron 297 connects to the rewind interlock line 220, a forward thyratron 300 connects to the forward line 221 and a backward thyratron 302 connects with the backward line 222; all are conditioned by connecting with the selector line 206. Said thyratrons 297, 300, and 302 are each respectively associated with a rewind interlock relay 298, a forward relay 301 and a backward relay 303. The rewind interlock thyratron 297 is fired by a positive signal upon the rewind interlock line 220 occurring when the selector line 206 is energized; this results in conduction through the energizing coil 298*a* connected thereto, actuating the armature of the rewind interlock relay contacting group 298*b*. The forward thyratron 300, when fired by a signal on the forward line 221 in the presence of selector line stimuli, energizes coil 301*a*, which actuates the relay contacting groups 301*b* and 301*c*. The backward thyratron 302 may likewise be fired by a signal on the backward line 222, and, when conductive, energizes the coil 303*a* to actuate the armatures of the backward relay contacting groups 303*b*, 303*c*, 303*d*, 303*e*, and 303*f*.

All relays associated with the unit operation control circuits, except the read relays 251 and the write relays 253, are telephone-type relays having an operating time of 12 milliseconds.

The response line 257 connects to the right-hand contacting member of the rewind interlock relay contacting group 298*b* which is contacted by its associated armature when de-energized. The armature of the contacting group 298*b* connects to the right-hand contacting member of the rewind relay contacting group 293*d*, which is contacted when de-energized by its assocated armature. This armature is joined to the armature of the backward relay contacting group 303*d* and the right-hand contacting member of the forward relay contacting group 301*b*. The right-hand contact of the backward relay contacting group 303*d* is joined to the clear response backward line 213, whereas the armature of the forward relay contacting group 301*b* is linked to the clear response forward line 212. Note: All the relays are shown in their de-energized position with their armatures contacting their associated right-hand members.

When all of the thyratrons of the local control circuits are non-conducting: The response gate 256 passes a selector signal on line 206 to the response line 257, whence it passes through the rewind interlock relay 298, the rewind relay 293, for delivery to the clear response forward line 212, and the clear response backward line 213, through members of the forward relay 301 and the backward relay 303, respectively. If the read thyratron 250 or the write thyratron 252 is fired, the response gate 256 does not pass a selector signal to the response line 257. Thus, delivery of signals either by the clear response forward line 212 or the clear response backward line 213 is prevented. If the rewind interlock thyratron 297 is fired, a signal is not delivered to the response lines 212 or 213, because of the open circuit which results from the actuation of the rewind interlock relay 298. And for the same reason, if the rewind thyratron 292 is fired, the response line 257 is effectively open circuited. The firing of the forward thyratron 300 prevents the delivery of a clear response forward signal on the line 212. However, a clear response backward signal may be delivered to the line 213 through the backward relay 303. The receipt of the clear response backward signal on line 213 effectively indicates that the backward thyratron 300 is in its nonconductive state, and the local control circuits are currently set up to perform a forward operation. If the backward thyratron 302 is fired and in its conductive state, a clear response forward signal may be delivered on line 212 under the same circumstances which indicates that the unit operation control circuits are currently set up to perform a backward operation. It will later be shown that the forward thyratron 300 and the backward thyratron 302 do not become conductive concurrently but that one is extinguished when the other is fired. Thus, either a clear response backward signal or a clear response forward signal must be received by the lines 212, 213 respectively, when the response signal is passed by the rewind relay 293. This will positively indicate that the rewind thyratron 292, the rewind interlock thyratron 297, the read thyratron 250 and the write thyratron 252 are clear and non-conducting and so prepared for the initiation of a new operation by the particular read-write unit. It is apparent that the forward thyratron 300 and the backward thyratron 302 need not both be extinguished in order to allow the delivery of signals to either of the lines 212 or 213 and to allow the initiation of a new operation. The two lines, 212 and 213, are used to supply additional information, indicating whether the read-write unit is set up to perform a forward or backward operation. This information is useful in initiating a new operation properly. The receipt of signals upon both lines 212 and 213 is equivalent to an indication that the unit is set up for forward operation.

The manner of extinguishing the rewind interlock thyratron 297 will now be considered, since the manner in which the read thyratron 250 and the write thyratron 252 are extinguished has already been discussed. The extinguishment of the rewind interlock thyratron 297 can be accomplished only by removing the positive D.C. potential supplied through the line 254 by the main unit interlock. The main unit interlock comprises an initial clear switch 306 having a left contacting member operatively joined to a positive source of D.C. potential, a right-hand contacting member returned to ground potential, and a contacting or switching arm which may be positioned to contact the left-hand or right-hand contacting member. When the contacting arm of the initial clear switch 306 is in the left-hand position D.C. voltage is supplied to a main unit interlock thyratron 304 through the series connection of a door switch 305, the left loop limit switch 90 and the right loop limit switch 95, and the energizing coil 260*a* of the main unit interlock relay 260. The delivery of said voltage to the main unit interlock thyratron 304 is conditional upon the door switch 305 and the loop limit switches 90, 95 being in the closed position. Conduction of the main unit interlock thyratron 304 is initiated by receiving a positive signal via differentiator 307 when the door switch 305 closes while the initial clear switch is in its operating position or when the initial clear switch 306 is transferred to the operating position while the door switch is in closed position. In this way, a positive potential is delivered to the main unit interlock thyratron 304 and a positive initiating impulse is passed through the differentiator 307 to fire it. It will be noted that the opening of the loop limit switches 90, 95 causes extinguishment of the thyratron 304 by removing the D.C. voltage, but clossing switches 90, 95 does not initiate conduction of the thyratron 304 because a positive initiating pulse is not delivered to the thyratron 304 through the differentiator 307.

The main interlock relay energizing coil 260*a* actuates the armatures of the relay contacting groups 260*b* to 260*g* inclusive. The main interlock relay contacting group 260*d* has its armature connected with the switch arm of the initial clear switch 306, so that the power supply bus 254 which is joined to the left-hand contacting member of said group 260*d*, receives positive D.C. voltage through the initial clear switch 306 when the main interlock relay 260 is energized.

Voltage may be removed from the D.C. voltage-supplying line 254 to clear the rewind interlock thyratron 297 by moving the initial clear switching arm to the right-hand grounded position. The main purpose of the rewind interlock thyratron 297 is to block operation of a read-write unit when it is desired that the particular unit should not be in condition for further operation until a previous operation has been carried out. For instance, when it is necessary that a reel of tape be changed before further operations are to be resumed, the rewind interlock thyratron 297 will remain conductive and block further operation by preventing response signals until the door switch 305 is opened in order to replace a reel of tape. This extinguishes the main interlock thyratron 304 removing voltage from the voltage supplying line 254 to clear the rewind interlock thyratron 297 as well as the other conducting thyratrons connected therewith. When the door switch 305 is closed the main interlock thyratron 304 is fired, as previously explained, to supply voltage to the bus 254 conditioning the unit for further operation. The purpose being to replace a reel of tape, the rewind interlock thyratron 297 is not fired unless the rewind thyratron 292 is also fired which results in the rewinding of the reel of tape preparatory to its removal. Thus it may be seen that the loop limit switches 90, 95 as well as other safety switches used in connection with the main unit interlock, stop operation of a unit and prevent initiation of further operation until remedial action is taken. Return to their original position does not fire the main interlock thyratron 304. They are not particularly associated with the clearing operating of the rewind interlock thyratron 297, although such switch actuation will incidentally clear the rewind interlock thyratron 297.

The actuation of the initial clear switch 306 to the right-hand off position causes removal of power received from the unit power supply of the particular unit involved. The initial clear switch 306, when turned to the left-hand on position, supplies the initial voltage necessary to start conduction of the main interlock thyratron 304. This is a condition precedent to the supply of unit power to the particular read-write unit. The initial clear switch 306 may also be used to clear the unit operation control thyratrons when a reel of tape is not be removed and it is not desirable to actuate the door switch 305.

The forward thyratron 300, the backward thyratron 302, and the rewind thyratron 292 are now further considered with respect to their related circuits. The forward thyratron 300 is connected through a differentiator 308 to the left-hand contact of the backward relay contacting group 303*f* which has its armature connected to ground potential and its right-hand contacting member joined to the rewind thyratron 292 through a differentiator 309. The backward thyratron 302 is linked through a differentiator 311 to the armature of the forward relay contacting group 301*c* which has its left-hand contacting member returned to ground potential, and also connects with the left-hand contacting member of the rewind relay contacting group 293*e*. The rewind relay contacting group 293*e* has its armature linked to the left-hand contacting member of the backward tape limit switch 47 which has an arm normally contacting a right-hand member and is returned to ground potential. The right-hand contact member of the rewind relay contacting group 293*e* connects with the armature of the backward relay contacting group 303*e*, which has it left-hand contacting member joined to the main interlock thyratron 304 through a differentiator 312. The forward tape limit switch 45 has an armature joined to ground potential which normally contacts a right-hand member and also a left-hand member joined to the main interlock thyratron 304 through the differentiator 312.

When the forward thyratron 300 is made conductive, the armature of the forward relay contacting group 301*c* moves to the left to contact the grounded member. The resultant negative impulse is transmitted through the differentiator 311 to the backward thyratron 302 causing its extinguishment if it was previously conducting. In a like manner, when the backward thyratron 302 becomes conductive, the armature of the backward relay contacting group 303*f*, moving to the left, delivers a negative impulse through the differentiator 308 to the forward thyratron 300 to assure its extinguishment.

Self-clearing of the backward thyratron 302 and the rewind thyratron 292 occurs after the completion of a rewind operation. It will be remembered that to perform the backward operation, backward thyratron 302 is fired as well as the rewind thyratron 292, the direction of tape drive for a rewind operation being in the backward direction. With the firing of the backward thyratron 302 the thyratron 300 will be extinguished as the armature of the backward relay contacting group 303*f* moves to the left. With the firing of the rewind thyratron 292, the associated armature of the rewind relay contacting group 293*e* swings to the left to return the left-hand contacting member of the backward tape limit switch 47 to the backward thyratron 302 through the differentiator 311. The actuation of the backward tape limit switch 47 is caused by an increase in the thickness of tape 32 passing over the idler guide wheel 43 and occurs at a time when the supply tape storage reel has been fully rewound (FIGURE 1). Tape thickness may be augmented by securing to the tape another flexible material of the same width as the tape and having the desired thickness. Thus, the backward tape limit switch 47 has its armature removed to the left contact position when the tape has been fully rewound in order to deliver a negative impulse through the differentiator 311 which extinguishes the backward thyratron 302. When the backward thyratron 302 is extinguished, the backward relay 303 is de-energized. Upon the de-energization of backward relay 303, the armature of the backward relay contacting group 303*f* returns to its right-hand contacting poistion and a negative impulse is delivered through the differentiator 309 to the rewind thyratron 292 extinguishing it. Thus, at the end of the rewind operation, the unit operation control circuits are cleared in preparation for a new operation; the unit is set to operate in a forward direction, which corresponds to the next operation to be performed.

When the read-write unit is not performing a rewind or rewind interlock operation, but is performing a backward operation, the backward tape limit switch 47, when actuated, extinguishes the main interlock thyratron 304 resulting in the shutdown of this particular unit. Since the tape is not run to such an extent during a backward operation that the backward tape limit switch 47 is normally actuated, the backward tape limit switch 47 here acts as a safety switch. Thus, when backward driving is abnormally extended and the tape storage reel 31 is fully rewound, the unit is put out of operation to prevent damage to the equipment and to allow correction of any defects before further operation by the unit is permitted. Movement of the backward tape limit switch to its right-hand position does not fire the main interlock thyratron 304; the main unit interlock is made operative again by resort to the initial clear switch 306 or the door switch 305.

The forward tape limit switch 45 in its safety switch function, extinguishes the main interlock thryratron 304, when the tape has been driven to its maximum permissible extent in a forward direction. This switch 45 is actuated when it senses a thickened section of the tape 32 (the means employed may be similar to those which actuate the backward tape limit switch 47). Since under normal conditions the forward tape limit should never be reached, when the forward tape limit switch 45 is actuated under abnormal conditions, the main interlock thyratron 304 is extinguished. The results are the same as when the main interlock thyratron 304 is extinguished by the backward tape limit switch 47.

A servo loop control device comprises a left loop selsyn 71 associated with a left reel motor 101, and a right loop selsyn 81 associated with a right reel motor 105, which have been illustrated in their mechanical aspects and functionally described in connection with FIGURES 1, 2, and 3. The servo loop control device may be divided into two parts which are substantially identical to each other; one associated with the left reel motor 101, and the other associated with the right reel motor 105. Therefore, what is said about the left loop control can be considered applicable to the right loop control of the servo loop control device. The left selsyn 71 and the right selsyn 81 have their primary windings connected in parallel to receive a fifty-volt 800 cycle per second signal from an amplifier 323 driven by a signal oscillator 322. The secondary winding of the selsyn 71 receives a reference signal by having one end connected to the junction point of two resistors connected across the output of amplifier 323. The other end of the secondary winding delivers a signal induced in the secondary from the primary winding of the selsyn 71. This signal is delivered through a detector 324 to an adder 321, which also receives a differentiated signal through the device 325 connecting with the detector 324. The adder 321 receives a shifting balance point signal through an integrator 320 from the line 318. The line 318 is energized by signals appearing on the line 296. These signals on line 296 are delivered by the central power lines to the center drive apparatus for center drive actuation. The signals derived from the line 296 are, however, first delivered to a detector 315 which excites an amplifier 316. Amplifier 316 in turn drives an inverter 317 and excites the line 318 through the backward relay contacting group 303*c* in its de-energized position. The excitation passes from the right-hand contacting member to its associated armature which is joined to line 318. The amplifier signal is also delivered to the left-hand contacting member of the backward relay contacting group 303*b*. The output signal from the inverter 317 is delivered to the left-hand contacting member of the backward relay contacting group 303*c* and to the right-hand contacting member of the backward relay contacting group 303*b*. When the group 303*b* is de-energized, the line 319 which is joined to the armature of that group receives excitation from the inverter 317. The inverter signal is delivered by line 319 through an integrator 330 to the adder 331 of the right control of the servo device. Thus, when the backward thyratron 302 is extinguished and the relay 303 is de-energized, an amplified detected signal from the center drive apparatus will be delivered to the adder 321 of the left control, and an inverted signal will be delivered to the adder 331 of the right loop control servo device. When a backward operation is to be performed, and the backward thyratron 302 is fired, the backward relay contacting groups 303*b* and 303*c* are energized to reverse signals delivered to the respective adders 321, 331, of the servo loop control device. The function of this reversal is to accomplish a shifting balance point operation preparatory to center drive operation. A signal delivered to the detector 315 when center drive power is delivered causes shifting of the loops to their steady state operating position during tape driving.

The adder 321 combines input signals and delivers the resultant through the amplifier 326 to the power control 327. The power control 327 determines whether or not driving power is to be supplied to the left reel motor 101. If power is to be supplied, power control 327 determines the direction in which the reel motor 101 is to be driven. If power is delivered at the upper output of the power control 327, the upper winding of the left reel motor 101 is placed in parallel with the series combination of a capacitor and the reel motor lower winding. If power is supplied by the lower output of the power control 327, the upper winding of the reel motor is effectively in series with the capacitor and in parallel with the lower winding of the reel motor. The direction in which reel motor 101 rotates depends upon whether the upper or lower output receives power. The left and right reel motors 101, 105 receive sixty c.p.s. alternating current from the unit power supply. This is achieved by returning the upper and lower windings of the reel motors 101, 105 at their respective junctions to one terminal of the power supply. The other ends of the windings are delivered to the second power terminal through the power controls 327, 337 and by main interlock contacting groups **260*e* and 260*f*, respectively, when in their actuated positions. In this manner power for driving the reel motors 101, 105** is applied or removed by action of the main unit interlock as previously described in detail.

The actuators 113 and 117 associated with the motor reel braking systems shown in FIGURES 2 and 3 are connected in series with each other and in parallel with a protective branch 341 comprising a series resistor and capacitor. One end of the serially connected actuator coils 113, 117 is coupled to a point of zero electrical potential. The other end of the coils 113, 117 is returned to a positive D.C. voltage of the unit power supply through a resistor-capacitor combination 340 going to the armature of the main interlock relay contacting group **260*g*. When this group 260*g* is in the energized position, its armature contacts the left-hand member which is in turn joined to a positive D.C. potential source. The function of the actuators 113, 117 each associated with a reel motor, as previously stated, is to release the associated brake bands when they are energized. Therefore, the reel motors are placed in condition for operation by brake release when the main interlock thyratron 304 is fired. On the other hand, the brakes are applied when the main interlock thyratron 304** is extinguished due to normal conditions or extinguished under abnormal operating conditions (such as by operation of safety switches already described, in which case application of the reel brakes may prevent extensive damage to the equipment and the tape which otherwise might continue to unreel).

FIGURE 4 illustrates schematically in greater detail the servo loop control device shown diagrammatically in FIGURE 5. Since the right and left loops are substantially identical, only the left loop control of the servo loop control device will be described. Reference will be made to the right loop control only when this is required for an adequate description of the servo loop control device. The power signals appearing upon line 296 associated with the center drive apparatus are delivered through a coupling capacitor 550 in series with a resistor 551 to the control electrode 552 of the detector valve 553. The control electrode 552 is negatively biased by returning to a potential of minus 150 volts through the resistor 551 and a grid resistor 554. The cathode 555 of the detector valve 553 is likewise returned to a negative potential by joining to the junction point of voltage dividing resistors 556 and 557 which are returned respectively to the negative potential of 150 volts and a potential of zero volts. The anode 558 of the detector valve 553 is directly linked to control electrode 561 of a normally conducting amplifier valve 560 and is returned to zero potential by both an anode resistor 549 and parallel charging capacitor 559.

The amplifier valve 560 has its cathode 562 returned to a negative potential of approximately 150 volts through a cathode resistor 563. Its anode 564 is connected to a positive potential of approximately 120 volts through an anode resistor 548 and is linked to the right hand contacting member and the left hand contacting member, respectively, of the backward relay contacting groups **303*c* and 303*b***.

An inverter valve 565 receives excitation upon its control electrode 566 from the anode 564 of the amplifier valve 560 through a resistor 567. Said control electrode 566 is negatively biased to cut off the inverter valve by returning to a negative potential of approximately 150 volts through a grid resistor 568. The inverter valve 565 has its cathode 569 linked to the cathode 562 of the amplifier valve 560, and its anode 570 returned through an anode resistor 571 to a positive potential. Anode resistor 571 is joined to the junction point of voltage dividing resistors 572 and 573 which return to a positive potential of approximately 150 volts and to the ground reference potential, respectively. Anode 570 is also joined to the right-hand member and left-hand contacting member, respectively, of the backward relay contacting groups **303*b* and 303*c***.

If a balance point signal is not received by the control electrode 552 of the detector valve 553, this valve remains non-conductive. The voltage applied to the control electrode 561 of the amplifier valve 560 is such that the said valve is maintained in a conductive state. The voltage drop across the capacitor 559 is equivalent to that which results across the anode resistor 549 from the grid current drawn by the control electrode 561 of the amplifier valve 560. When a balance point signal appears upon the control electrode 552 of the detector valve 553, the control electrode 552 swings sufficiently positive during a portion of its cycle to make the detector valve 553 conductive during such periods. This balance point signal may have a frequency of 120 c.p.s. or 30 c.p.s. depending upon whether a read (write) or rewind operation is being performed. Conduction of the detector valve 553 results in a negative voltage excursion of the anode 558 charging capacitor 559. When charging capacitor 559 is sufficiently charged after signal excitation is applied to the control electrode 552, the voltage upon the anode 558 is reduced delivering a lower voltage to the control electrode 561 of amplifier valve 560. The voltage reduction on the control electrode 561 is such that valve 560 is cut off and a positive signal is delivered to the control electrode 566 of the inverter valve 565 making it conductive. The time constant for the discharge of capacitor 559 is of sufficient duration to prevent conduction of the amplifier valve 560 when the signal input to the detector valve 553 executes the negative portion of its cycle. The valve 560 regains conduction only after the balance point signal has been removed long enough to allow the required discharge of capacitor 559. The discharging time constant is about 25 milliseconds. In a specific instance, using valves of the type commercially designated 6J5 for valves 553, 560 and 565, the use of the following component values has been found satisfactory:

| | | |
|---|---|---|
| Resistor **549** | ohms | 470,000 |
| Capacitor **559** | microfarad | .047 |

Thus, the detector valve 553 maintains a reduced voltage upon the control electrode 561 in response to an alternating current balance point signal. This reduced voltage causes the amplifier valve 560 to deliver a positive-going signal output and the inverter valve 565 to deliver a negative-going signal output. The amplifier valve circuit and the inverter valve circuit are so designed that the signal voltage delivered by the amplifier valve 560 when conducting is equal to the signal voltage output of the inverter valve 565 when it is conducting. Similarly, the output signals for the non-conductive states of the amplifier and inverter valves 560, 565 are equal.

The armature of the backward relay contacting group

303*c* when in its de-energized position serves to connect the anode 564 of the amplifier valve 560 to the control electrode 576 of a balance point valve 575 through a resistor 577. The armature of the backward relay contacting group 303*b* when in its de-energized position serves to connect the anode 570 of the inverter valve 565 in a like manner to a respective balance point valve of the right loop control in the servo loop device. When the backward control relay is actuated, the following interchange is effected: The control electrode 576 of the valve 575 is joined to the anode 570 of the inverter valve 565, while a control electrode of the respective balance point valve of the right loop control is joined to the anode 564 of the amplifier 560.

A resistor 579 and a rheostat 580 return the armature of the backward relay contacting group 303*c* to zero potential and are series connected with either the anode resistor 548 or the anode resistor 571, depending upon whether the backward relay is energized. The value of the rheostat 580 can be varied by a shorting arm permitting the adjustment of the voltage drop across the resistor 579 and rheostat 580. This voltage is delivered to the control electrode 576 of the balance point valve 575 through the resistor 577.

A clamping diode 578, which is normally conductive when the backward relay is de-energized, has its cathode connected to the armature of the backward relay contacting group 303*c*. Its anode is returned to the contacting arm of a potentiometer 582 which has one end returned through a resistor 581 to a positive voltage of approximately 120 volts while its other end is returned through a resistor 583 to a potential of zero volts. The minimum voltage below which the cathode of the clamping diode 578 will not be allowed to drop is adjustable by varying the arm position of the potentiometer 582. When the arm of the potentiometer 582 is moved to a more positive contact position, the clamping voltage is raised, whereas when the arm contacts a less positive position, the clamping voltage is correspondingly lowered.

An integrating capacitor 584 is also joined to the control electrode 576 of the balance point valve 575 bridging said grid to zero potential and being charged through the resistor 577 for delivery of an integrated signal to the control electrode 576. For example, before the balance point signal is applied to the detector valve 553, the control electrode 576 of the balance point valve 575 is maintained at its lower voltage limit by the conduction of clamping valve 578. When a balance point signal is received by the detector valve 553 the amplifier valve 560 is cut off. Thereby, the voltage at the anode 564 of valve 560 rises, clamping diode 578 is cut-off, and integrating capacitor 584 is charged through the resistor 577. Thus, as the charge upon the integrating capacitor 584 increases, the voltage upon the control electrode 576 likewise increases. Upon the removal of the balance point signal and the delivery of the reduced positive signal from the anode 564 of the amplifier valve 560, the integrating capacitor 584 is caused to discharge and a decreasing voltage which corresponds to the discharge voltage of the capacitor 584 is impressed upon the control electrode 576 of the balance point valve 575. When the voltage upon the control electrode 576 of the balance point valve 575 decreases, the voltage upon the control electrode of the right loop control balance point valve (which receives excitation from the inverter valve 565) increases, decreasing when the voltage upon control electrode 576 increases.

The cathode 585 of the balance point valve 575 is returned to zero potential through a cathode resistor 586 and the anode 587 of the same valve is linked to the anode 589 of a loop sensing valve 588 which receives a varying signal conditioned by the left selsyn 71 upon its control electrode 590.

A fifty volt R.M.S. 800 c.p.s. signal is delivered to the input windings of the selsyn 71. In this case a conventional selsyn is used. Power is delivered to only two of the three input leads, so that, in the event the input windings are connected in a star, two of the windings will be connected in series; or, if the selsyn input windings are connected in delta, two of the windings will be series connected with each other and connected in parallel with the third. In effect, the input selsyn winding may be represented as a single input winding 602. One end of the secondary winding or signal output winding 604 of the selsyn 71 is connected to the junction point of series resistors 600 and 601 bridging the selsyn input winding 602, and the other end is joined to the anode of a peak detecting diode 605 whose cathode is returned to a negative potential of approximately 150 volts through a resistor 606. The cathode of the peak detecting diode 605 is also returned to zero potential through a filter input capacitor 607 and is coupled to the control electrode 590 of the loop sensing valve 588 through a resistor 608. This control electrode 590 is returned to zero potential through a filtering capacitor 609 which, in combination with the resistor 608, forms a section of a high pass filter whose function is substantially to reduce or eliminate 800 cycles per second signal frequencies.

In the selsyn, when the input winding 602 is energized, the signal upon the output winding 604 depends upon the position of the output winding 604 which is capable of relative motion with respect to the input winding 602. In a given position the signal output of the winding 604 may be found to be at a minimum and practically negligible. If the relationship between the windings 604 and 602 is now altered, by rotating the output winding 604 relative to the input winding, signal output increases in amplitude until a maximum signal amplitude is obtained, let us assume after a rotational displacement of approximately 90°. If the output winding 604 is rotated in the opposite direction from the said point of minimum signal output, the output signal will also increase until a maximum signal amplitude is achieved for approximately 90° rotational displacement in this direction. However, in the latter case the signal output is 180° out of phase with the signal output obtained in the former case.

A reference 800 c.p.s. signal of approximately 25 volts R.M.S. is supplied to the output winding 604 of the selsyn 71 by connecting one end to the junction point of the resistors 600 and 601. By this means the signal induced in the output winding 604 by the input winding 602 modulates the reference signal so that when the selsyn output winding 604 is rotated past the minimum signal coupling point the signal output continues to increase or decrease while passing through said point. This eliminates delivery of a signal increasing in amplitude on either side of the point of minimum coupling. This effect is achieved because the 180° shift in phase of the induced signal when passing through the point of minimum coupling has the effect of continually increasing or decreasing the reference signal when added thereto. Thus, relatively linear signal amplitude output is achieved through a rotational angle of 180°, whereas without the use of such a reference signal an angular displacement of no more than 90° could be utilized.

The capacitor 607 is charged through the peak detector valve 605 to a point where the voltage on the cathode of diode 605 is raised to the peak voltage appearing upon its anode. When the voltage upon the anode of the diode 605 is lower than the voltage upon its cathode, as for instance, during less positive portions of the signal cycle, current flows from capacitor 607 through the resistor 606 to decrease the voltage level upon the cathode. This is necessary so that the cathode voltage may be capable of detecting the positive peak voltage upon the anode of the diode 605, for otherwise the cathode would remain more positive than the anode if the peak anode voltage were decreasing, thereby failing to respond to the downward trend.

As already noted, the voltage appearing upon the anode of the peak detecting diode 605 is determined by the rotational orientation of the output winding 604 with respect to the input winding 602, as signal modulation occurs with the rotation of the output signal winding 604. The value of the resistor 606 associated with the charging capacitor 607 is chosen to make the discharge rate of said peak charging capacitor 607 high enough to allow sufficient reduction of the voltage across the capacitor 607 so that it can effectively follow the most rapid rate of decline of peak voltage delivered by the output winding 604 of the selsyn 71. The maximum rate of peak voltage decline is limited by the time necessary for physical actuation of the output winding 604. In a specific instance, use of the following component values has been found satisfactory.

| | | |
|---|---|---|
| Resistor 606 | megohms | 10 |
| Capacitor 607 | microfarad | .03 |

The filter section, comprised of filtering capacitor 609 and resistor 608, filters out the voltage fluctuations occurring from one peak reading to another, and delivers an average d.c. signal which increases and decreases with the trend of peak signals received by the charging capacitor 607.

The loop sensing valve 588 has its cathode 610 returned to zero potential through a cathode resistor 611 which is paralleled by a differentiating capacitor 612. The anode 589 of the loop sensing valve 588, linked to the anode 587 of the balance point valve 575, is joined to the cathode 615 of a buffer valve 614. Buffer valve 614 is normally conductive and has its control electrode 616 directly returned to a potential of approximately 120 volts and its anode 617 joined to a potential of 420 volts through an anode resistor 618. The signal upon said anode 617 also energizes the control electrode 621 of a signal output driver valve 620 through a grid resistor 619. The driver valve 620 has its anode 622 directly linked to a positive potential of approximately 420 volts and its cathode 623 returned to zero potential through a cathode resistor 624 and is also joined to a signal driving line 625.

The anode current of the balance point valve 575 and the anode current of the loop sensing valve 588 are both received through the buffer valve 614 from the 420 volt source of potential through the anode resistor 618 as anode current, or, from the 120 volt source of potential, through the control grid 616 as grid current. The voltage on the cathode 615 of the buffer valve 614 is maintained within restricted limits, so that there are no large voltage variations on the anodes of the balance point valve 575 and the loop sensing valve 588. For the purpose of this consideration, therefore, the voltage may be regarded substantially constant. The lower voltage limitation of the cathode 615 of the buffer valve 614 is the voltage on the control electrode 616. If the cathode 615 attempts to go below this value, the control electrode 616 becomes positive with respect to the cathode 615 causing the flow of grid current to the cathode 615 which tends to prevent or minimize the amount by which the cathode swings negatively. The absolute upper limit of voltage upon the cathode 615 of the buffer valve 614 is the cut-off point. As the cathode 615 becomes more positive the control electrode 616 becomes more negative with respect thereto. This reduces the flow of current to the cathode 615 and tends to decrease the voltage thereon. The cathode 615 never goes so positive that the valve 614 is cut off, for if that were possible, the contradictory result would appear in that the current flow to the cathode 615 would be cut off which would result in the maximum possible reduction of voltage thereon.

The current passing through the cathode 615 depends upon the respective voltages on the control electrodes 576 and 590 of the respective valves 575 and 588. For example, as the voltage on the control electrode 576 of the balance point valve 575 goes more positive the anode current increases. The balance point valve 575 is self-biasing by virtue of the cathode resistor 586 so that, when the current therethrough increases due to a positive-going signal upon the control electrode 576, a voltage drop across the cathode resistor 586 also rises, maintaining proper biasing. If for the moment, the anode current received by the loop sensing valve 588 is constant, then the increasing current received by the anode 587 of the balance point valve 575 is delivered by the cathode 615 from the anode 617 of the buffer valve 614 through the anode resistor 618. The voltage drop across said anode resistor 618 increases to cause delivery of a negative-going signal to the control electrode 621 of the driver valve 620. It will be remembered that grid current will not be drawn through the buffer valve 614 unless the cathode 615 becomes negative with respect to the control electrode 616 which occurs when high currents are drawn by the valves 575 and 588. In this respect the buffer valve 614 is in the nature of a clamping diode supplying current and maintaining a minimum voltage level. Furthermore, the buffer valve 614 provides a means whereby current signals through the anodes of valves 575 and 588 are combined or effectively mixed to produce a composite voltage signal output at the anode 617 of the buffer valve 614. This use of the buffer valve 614 allows the utilization of a high impedance load resistor 618 providing a desired voltage amplification, while adequate current is still provided for the valves 575 and 588 without appreciable variation of voltage upon their anodes.

As previously considered, the clamping diode 578 determines the lower limit of voltage delivered to the control electrode 576 of the balance point valve 575. When a balance point signal occurs, the voltage upon the control electrode 576 increases as the charging capacitor 584 of the integrator circuit is charged. When the anode current of the balance point valve 575 increases with the positive swing of control electrode 576, more current is drawn through the anode resistor 618 of the buffer valve 614. The negative-going voltage upon the anode 617 of the buffer valve 614 is delivered to the control electrode 621 of the driver value 620 which effects the delivery of a lowered voltage to the signal driving line 625.

The FIGURE 6 describes the operating characteristics of the mixing circuit with regard to the loop sensing valve 588; let it be assumed that the signal voltage on the control electrode 590 is represented by the input voltage curve of FIGURE 6. As the control electrode 590 swings positively the anode current through the loop sensing valve 588 increases. The capacitor 612 which is in the nature of a differentiating element by the effect it produces causes the valve 588 to draw additional current over and above that which would flow in the absence of the capacitor 612. This additional current is drawn because the self-biasing of cathode resistor 611 cannot be affected until the differentiating capacitor 612 has been charged sufficiently to permit the normal operation of the cathode biasing resistor 611. Thus, when the control electrode 590 is going positively the additional current required by the differentiating capacitor 612 is determined by the rate of change of the signal upon control electrode 590. The charging current curve of FIGURE 6 illustrates this characteristic: the charging current increases to a constant rate, and remains constant for the time during which the slope of the input voltage curve (grid 590) remains constant, and decreases to zero when the slope of the input voltage curve is zero. Conversely, if the voltage upon the control electrode 590 decreases the current decline through the loop sensing valve 588 will be greater than it would be in the absence of differentiating capacitor 612. This is because the voltage across the cathode resistor 611 does not immediately follow the control electrode voltage downward, and is momentarily maintained by the so-called differentiating capacitor 612 which is caused to discharge through the cathode resistor 611. This resistor 611 must have a value sufficiently low so that the differentiating capacitor 612 is not unduly delayed in discharging therethrough. Thus, when the voltage upon the signal electrode 590 is increasing additional current is supplied to the loop sensing valve 588; this corresponds to the addition of a positive differential value. However, when the signal voltage upon the control electrode 590 is decreasing, the current delivered to the valve 588 is decreased beyond the corresponding value of control electrode voltage decline; this corresponds to the addition of a negative differential value.

Additional current is supplied by the flow of grid current through the control electrode 616 of the buffer valve 614 to assure that the charge of the differentiating capacitor 612 is not unduly delayed during a rapid rise of the voltage upon the control electrode 590 which requires high charging currents for the capacitor 612. Although the flow of grid current does lower anode current by limiting the negative excursion of the cathode 615, it does not prevent increased anode current conduction by the buffer valve 614, through the anode 617 increasing the voltage drop across the anode resistor 618. However, as will be seen later, the voltage variations beyond a given point in the extreme regions are not particularly important. The supply of current by the grid cannot be considered disadvantageous because the circuit is designed so that grid current of the buffer valve 614 will be drawn only for certain high current requirements and not during the normal range of current operation. For instance, the grid current of valve 614 will be drawn when high currents are required for charging the differentiating capacitor 612.

This arrangement is clearly advantageous for allowing a proper differentiating action and for forming and combining current variations to produce a composite voltage varying output signal which is graphically illustrated by the output voltage curve of FIGURE 6. It may be observed that this output voltage curve is composed of a curve following the input voltage added to the charging current curve of FIGURE 6. It is to be understood that the output voltage curve shown in FIGURE 6 is of a signal derived only from the loop sensing valve 588; the effect of current variations through the balance point valve 575 has not been taken into account, the current through the valve 575 having been considered constant. The variations through the valve 575 produce an effect additional to that produced by the valve 588, so that the output voltage signal will have combined therein an output voltage signal also derived from the variations in current through the valve 575. Thus, mixing or adding the input signals to the valves 575 and 588 plus a differential signal of the input signal to the valve 588 is effectively achieved.

The output voltage signal on the anode 617 of the buffer valve 614 is delivered to the driver valve 620, and causes the production of corresponding voltage variations upon the signal driving line 625. The signal driving line 625, deriving its signal from across the cathode resistor 624 of relatively low value, is a signal driving line of low impedance minimizing the transmission of noise signals and other interfering effects.

The signal driving line 625 is connected with the power control circuit 327. It will suffice to describe in detail the power control circuit 327, without so describing the power control circuit 337, also illustrated in FIGURE 4, which is connected with the respective signal driving line of the right loop control, since both circuits are identical.

The terminals 630 and 631 supplying 60 cycle, 110 volt A.C. from the unit power supply are bridged by a rheostat 632 joined in series with a resistor 633 and capacitor 634. The junction point of the rheostat 632 and resistor 633 is joined to the terminal 631 by means of a capacitor 635. The capacitor 634 is connected across series connected input windings 638 and 639 respectively of a signal input transformer 636 in the power control circuit 327 and a signal input transformer 637 of the right loop power control circuit 337.

The phase of the signal delivered to the input windings 638 and 639, with respect to the alternating signal appearing on the supply terminals 630 and 631, may be adjusted by varying the position of the movable arm of the rheostat 632 in the phase shifting network which arm joins terminal 630.

The signal input transformer 636 has two output windings 641 and 642, the output winding 641 having one of its ends coupled to the control grid of a gaseous or thyratron valve 644 through a grid resistor 643; this end of said winding 641 is also joined to the cathode of the power control valve 644 by means of a filter capacitor 645. In a like manner the other end of the output winding 641 is joined through a grid resistor 646 to the control electrode of a second thyratron type power control valve 647; it is also linked to the cathode of the valve 647 through a filter capacitor 648. The anodes of the valves 644 and 647 are joined by connecting to the ends of portions 650*a*, 650*b*, respectively, of the center tapped winding 650 of the power control transformer 649, having an input winding 652. The center tap 651 of the winding 650 is joined to the cathodes of the power control valves 644 and 647.

One end of the signal output winding 642 of the signal transformer 636 is connected through a grid resistor 653 to the control electrode of the thyratron valve 654, and is joined to the cathode of said valve 654 through a filter capacitor 655. In a similar manner, the other end of the winding 642 is linked with the control electrode of a thyratron valve 657 through a grid resistor 656 as well as with the cathode of said valve 657 through a filter capacitor 658. The anodes of the valves 654 and 657 are joined by connecting to the ends of portions 660*a* and 660*b*, respectively of a signal output winding 660 of a power control transformer 659, having an input winding 662. The center tap 661 of the output winding 660 is directly linked to the cathodes of the thyratron valves 654 and 657.

The signal driving line 625 is connected to the junction point of resistors 665 and 666, which are series connected bridging across the signal output winding 641, and is also joined to the cathodes of the power control valves 654 and 657. The cathodes of the power control valves 644 and 647 are joined to a reference potential by connecting to an adjustable tap of a voltage dividing resistor 670. A reference potential of a lower value is also supplied to the junction point of resistors 667 and 668 connected in series across the signal output winding 642. The voltage dividing resistor 670 which is connected in parallel with the voltage dividing resistor 671 associated with the power control circuits of the right loop control, has one end connected to a positive potential of approximately 410 volts through a series resistor 672 and the other end returned through a series resistor 673 to positive potential of approximately 120 volts.

One lead of each of the input windings 652, 662 of the power control transformers 649, 659 is returned to the power terminal 674 of the terminals 674, 680 receiving 60 cycle per second 110 volts alternating current from the unit power supply, through the main interlock contacting group 260*f* when in its energized position. The remaining two leads of the input windings 652, 662, respectively, of the power transformers 649, 659 are respectively joined to the motor windings 676 and 678 of the left reel motor 101 by means of the rheostats 675 and 677. The two ends of the motor windings 676, 678 joined with the transformer windings 652, 662, respectively, are coupled to a phase shifting capacitor 679, and the other ends of said motor windings 676, 678 are directly returned to the power supply terminal 680.

Power for the right reel motor 105 is supplied by the power supply terminals 674 and 680 through the main interlock contacting group 260*e* in a similar manner.

Considering first the operation of the power control thyratrons 644 and 647, a sixty cycle per second signal is delivered to each control electrode of the valves 644 and 647. Since the signals are being derived from opposite ends of the signal output winding 641, they are 180° out of phase with each other. Sixty cycle alternating voltage is then supplied to the anodes of the power control valves 644, 647 through the power control transformer 649 when the main interlock relay contacting group 260f is energized. The alternating signals upon the anode of the valve 644 are 180° out of phase with the signals upon the anode of the valve 647, because each anode is connected to a different end of the power winding 650. The phase relationship of the alternating signals upon the anode and control electrode of power control valve 644, as well as of the valve 647, is adjusted by varying the rheostat 632 of the phase shifting network so that the signal upon the control electrode lags the signal upon the anode of the particular valve by a phase angle of approximately 90°. It is easily seen that, when the phase relationship is properly adjusted for the power control valve 644, the proper phase relationship of the said signals is also established for the power control valve 647. A phase relationship identical to that established in the valves 644 and 647 is effected between the anode and control electrode signals of the power control valves 654 and 657. In both instances, anode voltage leads the control electrode voltage by a phase angle of approximately 90°.

The cathodes of the power control valves 644 and 647 are returned to a reference potential by connecting to a voltage tap upon the voltage dividing resistor 670. Thus, a variable positive or negative bias may be exerted upon the control electrodes of the valves 644 and 647, with respect to their cathodes, for variations in the voltage upon the signal driving line 625 which is effectively coupled with the control electrodes of said valves. The voltage upon the signal driving line 625 determines when the valves 644, 647 are to become conductive and, if so, during what period of their positive anode voltage excursion they will conduct. Thus, if the potential upon the signal driving line 625 is sufficiently low, the 60 cycle alternating signal imposed thereon may not reach a sufficiently positive potential during the positive peak of the alternating signal to fire the valves 644, 647. As the signal upon the power driving line 625 becomes more positive, a point will be reached when the alternating cycle peak swings the control electrode voltage just sufficiently positive to cause conduction in the valves 644, 647. It is to be remembered that the related signals of the power control valves 644 and 647 are 180° out of phase, so that these valves are not conductive at the same time but only during periods that are 180° out of phase.

The reason for maintaining the phase shift of 90° between the anode and control electrode signal voltages can now be explained by the effect achieved as the signal upon the signal driving line 625 swings positively. The use of this phase shift and the varying signal upon the signal driving line causes the power control valves to be conductive for an increasing period during which positive voltage is applied to the anode (measured with respect to the cathode) as the voltage upon the signal driving line 625 goes more positive and, conversely, as this voltage becomes less positive. The maximum period during which one of the power control valves can be conductive is one-half cycle, this being the maximum period during which positive voltage is applied to its anode with respect to its cathode. When a control valve becomes conductive before positive voltage is removed from its anode, it will be extinguished as soon as positive voltage is removed from its anode. The period of control of valve conduction is, therefore, determined by the point at which the said valve is fired during the period of positive anode voltage with respect to the point of extinction of the control valve which is occasioned by the negative voltage upon the anode. As the voltage upon the signal driving line 625 increases, the firing point of the power control valves is respectively advanced until the point is reached where one control valve is conducting throughout the period of positive voltage upon its anode and its related valve is conducting during the entire period of positive voltage upon its anode, 180° out of phase, so that one valve is always conducting while the other is nonconducting.

A similar result is effected by the power control valves 654 and 657, which effectively have their control electrodes maintained at a reference D.C. potential while their cathodes effect variable biasing by connecting with signal driving line 625. In this case, neither of the valves 654, 657 is conductive when the potential upon the signal driving line 625 is sufficiently positive; increasing periods of conduction are obtained when the potential upon the line 625 decreases. For sufficiently low voltage upon the signal driving line 625 one valve will always be conducting when the other is nonconducting.

If the D.C. reference potential delivered to the cathodes of the valves 644 and 647 is properly adjusted, with respect to the references D.C. voltage delivered to the control electrodes of the valves 654 and 657, for a given voltage upon the signal driving line 625 none of the valves 644, 647, 654, 657 will conduct. Adjustment may be made of the reference potentials, which will cause the power control valves 644 and 647 to become conductive upon a slight upward rise from the given or neutral potential upon the signal driving line 625, and will cause the valves 654 and 657 to become conductive upon a slight downward voltage excursion of the line 625. To initiate the conduction of either one pair of valves 644, 647 or the other pair 654, 657, the necessary change in voltage above or below the given neutral value on line 625 decreases as the reference potentials approach each other, such as when the taps upon the voltage dividing resistor 670 are moved to points of greater proximity. If the valves 644, 647, 654, and 657 are to remain nonconductive for a given neutral voltage upon the signal driving line 625, the minimum voltage between the taps on the voltage dividing resistor 670 cannot substantially be less than the peak to peak voltage of the sixty c.p.s. signal offered by the signal output windings 641, 642 of the signal input transformer 636.

The filter capacitors 645, 648, 655, and 658 effectively bypass 800 c.p.s. signal on the signal driving line 625 not previously removed, preventing the exertion of any control by such signals upon the control electrodes with respect to their cathodes of the respective valves. The said filter capacitors, however, do not substantially bypass sixty c.p.s. signals entering the control electrodes of the power control valves.

When the voltage upon the signal driving line 625 is such that the power control valves 644, 647, 654, 657 are all nonconductive, the output windings 650 and 660, respectively, of the power control transformers 649 and 659 are connected to a relatively high impedance load. The high impedance is effectively reflected by transformer action into the input or primary windings 652 and 662, respectively, of the power control transformers 649 and 659. Thus, a high impedance is effectively inserted in series respectively with the motor windings 676 and 678 preventing current flow through the windings to keep the reel motor 101 inoperative. Take the instance wherein the motor control valves 644 and 647 are conductive; as when the voltage upon the signal driving line 625 has been increased sufficiently. When either of the power control valves 644 or 647 is conductive, an extremely low impedance load is effectively connected across the output winding 650 of the power control transformer 649, resulting in the reflection of a low impedance in series with the motor winding 676 and allowing current flow therethrough. Current is also delivered to the motor winding 678 passing through the capacitor 679 which causes the current therethrough to be shifted in phase with respect to the current through the motor winding 676. The current through the winding 678 leads the current through the winding 676, and causes the left reel motor 101 to rotate and unreel the tape 32 carried by the left storage reel 31 (FIGURES 1 and 2). The rheostat 675 in the path of current flow acts to increase or decrease the current passing through the windings 676, 678 and thus determines the power delivered by the left reel motor 101 when actuated in the reel out direction.

When the voltage on the signal driving line 625 is below the given neutral point and the power control valves 654 and 657 are conducting, a low impedance is reflected in series with the motor winding 678 allowing current flow therethrough. Current also passes through the motor winding 676 by means of the capacitor 679. Capacitor 679 causes this current to lead the current through the winding 678. With this arrangement the motor rotates in a direction opposite to that effected when the current is directly received by the motor winding 676. Thus, the valves 654 and 657 cause the motor to reel in tape whereas the valves 644 and 647 when conducting, cause the motor to reel out the tape. The rheostat 677, which is in the current path during a reeling-in operation, controls the current and, thereby, the power delivered to the left reel motor 101 during the reeling-in. During a reeling-in operation, the power requirement is greater than during a reeling-out operation, because during reeling-out, the reeling motor is rotating to supply tape in the direction of loop tension, while when reeling in the motor operates against loop tension. The adjustments of rheostats 675 and 677 are also made with respect to adjustments of the two rheostats associated with the right reel motor 105. For example: When the left reel motor 101 is reeling out, the right reel motor 105 must be made to reel in the tape at a rate corresponding to the reeling-out operation. When the left reel motor 101 is reeling in tape, the right reel motor must have its power delivery adjusted so that tape is reeled out at the proper rate.

From the preceding description of the power control circuit, it is evident that the speed, direction, and rotation of the reel motors 101, 105 may be effectively controlled by the positive signal delivered over the signal driving line 625. Thus, when the voltage on line 625 is much below the neutral point the power control valves 654 and 657 will be fully conducting to supply full power to the left reel motor 101 in the reel-in direction. As the voltage on the line 625 approaches the neutral point, conduction of the valves 654 and 657 will be reduced. This effects a reduction in the average power delivered to the left reel motor 101, and affords greater control for small adjustments required by the left reel motor 101. When the voltage on the line 625 is at the neutral point, the left reel motor 101 will remain inactive. As the voltage on the line 625 rises above the neutral point, the valves 644 and 647 become increasingly conductive causing the left reel motor 101 to rotate in the reel-out direction, average power delivery being determined and increased to a maximum as the driving signal goes more positive.

It may be noted that the control exerted upon the right reel motor 105 is identical to that just described upon the left reel motor 101. The right reel motor 105 is inactive when its corresponding driving signal is at its neutral point, and reel-in rotation is effected for voltage below the neutral point and reel-out rotation is effected when the driving voltage is above the neutral point.

Consider now the operation of the servo loop control device as related to the tape reeling apparatus disclosed and described in connection with FIGURES 1, 2 and 3. First assume that the left reel motor 101 and the right reel motor 105 are both inoperative, neutral driving signals being supplied to their respective power control circuits. To determine the positions of loops 37 and 42 under such conditions with the apparatus set up for forward operation, reference is had to the position of the arms 70 and 80, respectively, of the selsyns 71 and 81. Left selsyn 71 must be positioned to deliver the signal peak detecting diode 605 (FIGURE 10) a more positive signal than is delivered by right selsyn 81 to its corresponding peak detecting valve. This is so because a less positive signal is delivered to the balance point valve 575 through the backward control relay 303 than is delivered to the corresponding balance point valve of the right loop control; and also, because the neutral driving voltages which are being delivered are substantially equal in both cases, greater conductivity is required on the part of the loop sensing valve 588 to make up for the reduced conduction of the valve 575. The right loop control, whose balance point valve receives a more positive control electrode voltage, has its conductivity increased and requires a reduction in conductivity of its loop sensing valve to produce the required neutral driving signal. FIGURE 1 shows the selsyn arms 70 and 80 prior to delivery of balance point signal under these conditions, and shows the left selsyn 71 delivering an increased signal output and the selsyn 81 in position to deliver a decreased signal output. Clockwise rotation of arm 80 of selsyn 81 causes increased signal output as does counterclockwise rotation of arm 70 of selsyn 71.

It is now assumed that the apparatus is set up for backward operation and the balance point signal has not yet been delivered, the neutral voltage on the signal driving lines is achieved by a decreased signal output delivered by selsyn 71 and an increasing output delivered by the selsyn 81, effected by the clockwise rotation of the selsyn arm 70 and the clockwise rotation of the selsyn arm 80 corresponding to positioning the loop tensioning pulleys 35 and 40 in their backward balance point positions 35′ and 40′. This loop arrangement is effected when the apparatus is set up for backward operation because the energizing of the backward control relay 303 results in the delivery of a higher potential to the control electrode of the balance point valve 575 and lowered potential upon the control electrode of the corresponding valve in the right loop control.

The transition from one balance point position to another balance point position is effected through an integrator 577, 584 associated with the balance point valves of the right and left loop control. For example, when shifting from the backward balance point to the forward balance point, voltage upon the control electrode 576 of the balance point valve 575 gradually increases while that delivered to the balance point valve of the right loop control gradually decreases. The increased current through the balance point valve 575 results in a lowered control electrode potential in the driver valve 620 decreasing the voltage delivered by the driving line 625 to a value below the neutral point. This results in firing the power control valves 654 and 657 causing the actuation of the left reel motor 101 in the reel-in direction. Tape reel-in by the left reel motor 101 results in decreasing the size of the loop 37 which actuates the selsyn arm 70 lowering the signal voltage delivered by the selsyn 71. The decreasing positive signal delivered by the left selsyn 71 reduces the current flow through the loop-sensing valve 588 causing a positive voltage excursion upon the anode 617 of the buffer valve 614 effecting the delivery of an increasingly positive signal to the driving line 625. Thus, because of the servo loop (comprised of the left reel motor 101, the loop 37 and connecting means to the selsyn 71 and the left loop control circuit to the power control circuit) the voltage upon the driving line 625 continues to increase until the neutral point voltage is attained, at which time the loop 37 is shifted to the backward balance point position prior to center drive actuation.

In the same manner, when a lowered voltage acting through a servo loop is delivered to the balance point valve of the right loop control, a signal results in the driving line above the neutral point. This signal causes the right reel motor 105 to execute a reeling-out operation increasing the dimensions of the loop 42 to the point where the loop 42 in the proper backward balance point position. At the same time, the right selsyn 81 delivers the increased signal output necessary to effect the decrease in driving line potential, so that the neutral point voltage is attained by the driving line whence the right reel motor 105 is again inoperative.

With regard to adjusting the balance point positions of the loops 37 and 42 it may now be seen that the clamping diode 578 determines the lower limiting position of the left loop 37, whose size decreases as the potential upon the anode is increased, and whose size increases as the potential upon the anode is decreased. The upper position of the loop tensioning pulley 35, corresponding to the minimum size of loop 37, is adjustable by use of the potentiometer 580, an increase in its series resistance effecting a decrease in the size of loop 37, and a decrease in its series resistance resulting in an increase in the minimum size of the loop 37. Similar adjustments in the right loop control circuits likewise determine the minimum and maximum loop dimensions of the right loop 42: the limiting positions of the loop 42 are adjusted to correspond directly with the limiting positions of the left loop 37 as indicated in FIGURE 1.

When the backward control relay 303 is de-energized conditioning the servo loop control device for forward operation, transition in like manner to the reverse direction is effected, whereby the left loop 37 is increased to its maximum loop size position and the right loop 42 is decreased to its minimum loop size position shown by FIGURE 1. The transition time required to move from one balance point position to another is approximately .6 second.

Consideration is now had of the case where the loops 37 and 42 are set up for forward operation and the balance point signal is thereafter supplied to the servo loop control device. After the balance point signal has been received, a positive-going signal is delivered to the left loop control and a negative-going signal to the right loop control. Thus, another mechanism now operates to effect shifting from the instant balance point position to the other balance point position which corresponds to the backward balance point position before the balance point signal is received by the servo loop control device. However, in this case when shifting occurs due to the receipt of the balance point signals, actuation of the center drive motor 110 is also effected, which, in removing tape from the left loop 37 and moving tape to the right loop 42, tends to increase the rate at which the balance point is shifted. The rate of increase of voltage upon control electrode 576 of the balance point valve 575 is determined by its associated integrator 577, 584 which increases the conductivity of this valve at a slower rate than the conductivity of the loop-sensing valve 588 is decreased, due to the signal derived from selsyn 71 sensing the rapidly shrinking loop 37. For the resulting total decrease in current through the anode resistor 618, the voltage upon the driving line 625 increases above the neutral point causing more tape to be reeled out to limit the rate of shrinkage of the loop 37. The increased voltage also permits the acceleration of the left reel motor 101 to the extent that its speed will be sufficiently high for tape delivery to the center drive wheel 39 without further shrinkage of the tape loop 37 beyond the minimum loop size dimension. The significance of the integrator 577, 584 is in part here revealed, since it is apparent that without it, the left reel motor 101 would execute a reeling-in operation in an attempt to reduce the size of the loop 37 to its final decreased dimension immediately upon the appearance of the balance point signal. This defeats the object of allowing a sufficient period for acceleration of the left reel motor 101 in the reel-out direction so that operating speed may be attained after a given period. In fact, without the integrator, the left reel motor 101 would be accelerated in the opposite direction placing it in an even less favorable position compared with its inoperative state.

The constant displacement of tape by the center drive wheel 39 does not allow the neutral point voltage to appear upon the signal driving line 625, even though the voltage upon this line approaches the neutral point voltage. The difference between this voltage and the neutral point voltage is known as the velocity error signal. It is necessary to provide a driving signal upon line 625 which maintains the velocity of the storage reels for supplying and taking up tape displaced by the center drive wheel 39.

When the balance point signal is removed from the servo loop control device, the signal delivered to the control electrode 576 of the balance point valve 575 decreases at a rate determined again by the integrator 577, 584. However, the deceleration and stopping of the center drive motor 110 causes the enlargement of the left loop 37 and a dimensional decrease in the right loop 42 at a rate greater than the corresponding voltage change upon the control electrode 576 of the balance point valve 575. As a result, the left selsyn 71 delivers a more positive signal than is required to maintain the driving line 625 at its neutral point. The increased current flow through the anode 618 causes a voltage, which is below the neutral point, upon the driving line 625.

This voltage results in delivery of power corresponding to a reeling-in operation of the left reel motor 101, but in this case, where the left reel motor 101 is already executing a reeling-out operation, the reeling-in power acts as a brake decelerating the left reel motor 101. The deceleration of the left reel motor 101 continues until the motor stops rotating at which time the main loop pulley 35 has assumed its original position, namely, the position in which the loop 37 has reached its maximum dimension.

Although the operation has been discussed mainly with regard to the left loop 37, the right loop control circuits operate upon the same principles so that the right loop 42 is enlarging when the left loop 37 is decreasing in size and the right loop is decreasing when the left loop is increasing in size.

With the backward control relay 303 energized and the loops 37, 42 positioned initially in the backward balance point position, reversed reactions on the part of the left loop 37 and the right loop 42 occur when the balance point signal is applied. The loop 37 increases in dimension and the loop 42 decreases in dimension to their limiting position, and conversely, when the balance point signal is removed. The principles of operation, however, are similar to those explained with regard to the first case considered.

The manner in which over-shooting, hunting, and instability of reel motors 101, 105 are minimized will now be considered. Referring again to FIGURE 6, the input voltage curve indicates the signal voltage input which is delivered by selsyns 71, 81 when it shifts from one output voltage to another output voltage in an attempt to attain a neutral driving line voltage. The addition of the differential signal to the input voltage signal results in an output voltage signal upon the driving line 625 which, for approximately one-half its duration, applies a positive acceleration while for the other remaining half period applies a negative accelerating signal, so that the reel motor 101, 105 will not overshoot or hunt about its proper state. The differentiating capacitor 612 is chosen so that this proper operational state is attained, the proper differential valve required being a function of the frictional and other such effects upon the reel motors 101,

105. A similar effect is achieved when the input voltage to the grid 590 of the loop-sensing valve 588 decreases from a more positive valve, in which case a negative differential signal is combined with the input voltage signal.

Greater stability in operation is also achieved when the balance point signal is being applied and removed at a rate allowing insufficient time for balance point shifting from one position to the other. The integrator 577, 584 associated with the left loop control and the integrator associated with the right loop control, apply an averaged signal voltage to the respective balance point valves of the left and right loop controls tending to maintain the main loop pulleys 35, 40 in a position intermediate the initial and final operating positions.

To understand this more clearly, assume that the voltage on the integrating capacitor 584 has assumed an intermediate voltage between maximum and minimum voltage supplied to the control electrode 576 of the balance point valve 575, while the voltage on the control electrode 576 varies above and below this value as the balance point signals applied and removed, and the backward control relay 303 is de-energized. As already explained, the reel motor 101 will be actuated in the direction necessary to cause the driving line 625 to assume its neutral voltage, thus, the loops 37 and 42 will assume positions corresponding to the signal on the control electrode 576 of the balance point valve 575 and the related valve of the right loop control. If the loop positions are considered to correspond to the average signal voltages on the balance point valves of the left loop control and right loop control when the signal on the control electrodes of the said valves are varying in the region close to this average point, the correction voltage, to wit, the voltage above or below the neutral point on the driving line 625, is sufficiently small so that full reel-out or reel-in power is not applied during such times. Thus, another advantage of the integrator associated with the balance point valves is that when the balance point signal is applied and removed in rapid succession, the voltages applied to the balance point valves being caused to vary in the region of an average value, greater operating stability is achieved. Without the use of the integrator, maximum power would be applied to the reel motors in one direction and shortly thereafter reversed for full power application in the other direction. In this connection, it must be remembered, that this advantage is achieved only because the power control circuits are capable of applying power which, within a given range, corresponds to the amount of error signal above or below the neutral voltage on line 625.

While this invention has been described and illustrated with reference to a specific embodiment, it is to be understood that the invention is capable of various modifications and applications, not departing essentially from the spirit thereof, which will become apparent to those skilled in the art.

What is claimed is:

1. In a power control link: a power control line; a first control circuit comprising a pair of valves each including a control electrode operatively connected to said power control line, a cathode maintained at a substantially constant direct current voltage and an anode, a first alternating signal source delivering signals of differing phase sense to each of the control electrodes of said first control circuit, a first power transducer comprising an input winding and a center-tapped load winding having each end respectively connected to an anode of a valve in said first control circuit and having its center tap operatively connected to the cathodes of said valves, a first power system including a line operatively connected with the input winding of said first power transducer; and a second control circuit comprising a pair of valves each including a cathode operatively connected to said power control line, a control electrode maintained at a substantially constant direct current voltage and an anode, said direct current voltage level upon the control electrode bearing a given relationship to the voltage level maintained upon the cathodes of said first control circuit, a second alternating signal source delivering signals of differing phase sense to each of the control electrodes of said second control circuit, a second power transducer comprising a input winding and a center-tapped load winding having each end respectively connected to an anode of a valve in said second control circuit and having its center tap operatively connected to the cathodes of said valves, and a second power system including a line operatively connected with the input winding of said second power transducer.

2. In a motor control apparatus, a first motor, a first signal receiving unit connected to said first motor, a first signal link conditionally transmitting signals to said first unit, a phase shifting network operatively connected between a means for connecting to an alternating signal source and said first signal link, a second motor a second signal receiving unit connected to said second motor a second signal link operatively connected between said means for connecting to a signal source and said second unit and conditionally transmitting signals to said second unit, and a conditioning circuit operatively connected to said first and second signal links.

3. In a motor control system including a motor for driving equipment selectively in either of two directions, means for generating first signals representative of the instantaneous condition of the equipment, means for generating second signals representative of a desired state of said equipment, and mixer means responsive to said first and second signals for controlling the rotation of said motor, further including a peak detector circuit connected to the output of said means for generating a first signal representing the instantaneous condition of equipment driven by said motor, said detector circuit comprising a diode having an anode and a cathode, said anode being connected to the output of said means for generating said first signal, means for connecting said cathode to a source of high negative potential for biasing said diode for conduction only upon the application of a high positive potential to said anode, a filter arrangement connected to said cathode for eliminating high frequency signals from the output of said detector, and a normally conducting electron discharge device having an anode, a cathode and a control grid, said control grid being connected to the output of said filter circuit for receiving filtered output signals from said detector, the anode of said electron discharge device being connected to an input of said mixer.

4. In a motor control system including a motor for driving equipment selectively in either of two directions, means for generating first signals representative of the instantaneous condition of the equipment, means for generating second signals representative of a desired state of said equipment, and mixer means responsive to said first and second signals for controlling the rotation of said motor, the improvement in said mixer comprising a first electron discharge device having a first anode, a first cathode, and a first control grid; a second electron discharge device having a second anode; a second cathode, and a second control grid; said first and second anodes and said first and second cathodes being connected together to form two parallel branches; a third electron discharge device comprising a third anode, a third cathode, and a third control grid; said third control grid being maintained at a substantially constant potential; said third cathode being connected to said first and second anodes; a first resistor connected at one end to said third anode and at its other end to a source of high positive potential, whereby electrical energy supplied to the anode-cathode circuits of said first and second devices passes through the anode-cathode circuit of said third device; said first control grid being connected to the output of said means for generating first signals; said second control grid being connected to the output of said means for generating second signals; and a second resistor coupled at one end to the junction point of said first resistor and said third anode and coupled at its other end for controlling said motor; the current flow through said third discharge device and said first resistor being determined by the composite currents flowing through said first and second discharge devices as determined by the first and second signals applied to said first and second control grids respectively.

5. In a motor control system including a motor for driving equipment selectively in either of two directions, means for generating first signals representative of the instantaneous condition of the equipment, means for generating second signals representative of a desired state of said equipment, and mixer means responsive to said first and second signals for controlling the rotation of said motor, the improvement wherein said motor comprises a first and a second motor winding, and means for selectively energizing said motor to place said equipment in the desired state comprising a first transformer having a first center tapped primary and a first secondary, said first secondary being connected to said first motor winding; a second transformer having a second center tapped primary and a second secondary, said second secondary being connected to said second motor winding; a first pair of electron discharge devices each having an anode, a cathode, and a control grid, said cathode being connected together and to the center tap of said first primary and said anodes being each connected to one end of said primary; a second pair of electron discharge devices each having an anode, a cathode, and a control grid, said last-named cathodes being connected together and to the center tap of said second primary and said last-named anodes being each connected to one end of said second primary; means for maintaining said control grids of said first pair of discharge devices at a first substantially constant potential; means for maintaining the cathodes of said second pair of discharge devices at a second substantially constant potential which is related to said first potential; means for supplying said control grids of both pairs of electron discharge devices with electrical energy; and means for connecting the output from said mixer to the cathodes of said first pair of discharge devices and to said control grids of said second pair of discharge devices.

6. In a motor control system including a motor for driving equipment slectively in either of two directions, means for generating first signals representative of the instantaneous condition of the equipment, means for generating second signals representative of a desired state of said equipment, and mixer means responsive to said first and second signals for controlling the rotation of said motor, the improvement in said first named means comprising an induction apparatus having first and second windings in induction relation to each other, said first winding adapted to be energized with alternating electrical energy whereby alternating electrical energy is induced in said second winding, said second winding being mounted for rotation with respect to said first winding whereby the amplitude and phase relation of the energy induced in said second winding to that in said first winding is dependent upon the relative rotational positions of said first and second windings, means for connecting one end of said second winding to said first winding at a point intermediate its ends, means for connecting the other end of said second winding to said mixer means, and means for placing said second winding in rotational positions indicative of the condition of the equipment driven by said motor.

7. In a motor control system including a motor for driving equipment selectively in either of two directions, means for generating first signals representative of the instantaneous condition of the equipment, means for generating second signals representative of a desired state of said equipment, and mixer means responsive to said first and second signals for controlling the rotation of said motor, the improvement in said second named means comprising means for generating an order signal, a detector for receiving said order signal, an amplifier connected to the output of said detector, and an inverter circuit selectively connected in the output circuit of said amplifier for inverting the output of the amplifier when inserted into the circuit, and an integrating circuit, the outputs of the amplifier and the inverter being selectively connected to the input of the integrating circuit, the output of said integrating circuit being applied to an input of said mixer.

8. A tape drive system comprising reversible means for driving the tape in either of two opposite directions, tape storage means including a reel and reel drive motor, means for establishing a slack loop in the tape between the tape drive means and the reel, means for generating a control signal indicative of the length of the loop, means for generating a reference signal, means responsive to the direction of the reversible tape drive means for setting the reference signal to one of two different predetermined values depending on the direction of movement of the tape by the drive means, means for producing an error signal with changes in the control signal with relation to the reference signal, whereby the error signal is modified with changes in direction of the tape, and means for controlling the reel motor in response to the error signal to maintain the correct loop length, the average length of the loop being determined by the reference signal.

9. Apparatus as defined in claim 8 wherein said means for varying the reference signal shifts the reference signal to produce zero error signal with a maximum loop length in the loop when the drive means is feeding tape to the reel and shifts the reference signal to produce zero error signal with a minimum loop length in the loop when the drive means is withdrawing tape from the reel.

10. A high speed tape feeding apparatus comprising a pair of reels between which the tape feeds, one of the reels of said pair operating as a supply reel while the other operates as a take up reel, said tape being formed with a loop below each reel, means to feed the tape at high speed from said supply reel to said take up reel, a first motor being provided for rotating said supply reel at a high speed, a second motor being provided for rotating said take up reel at a high speed, control means responsive to any change in the length of the tape loop associated with said supply reel for varying the speed of said first motor, and other control means responsive to any change in the length of the tape loop associated with said take up reel for varying the speed of said second motor, said control means being oppositely responsive to the same direction of change of their respective tape loops.

11. A high speed tape feeding apparatus comprising a pair of reels between which the tape feeds, one of the reels of said pair operating as a supply reel while the other operates as a take up reel, a tape feeding means, said tape being guided by said tape feeding means and being formed with a slack loop below each reel, said tape feeding means being effective to feed said tape at high speed, a first motor being provided for rotating said supply reel at a high speed, a second motor being provided for rotating said take up reel at a high speed, control means responsive to any increase in the length of the tape loop associated with said supply reel for decreasing the speed of said first motor, and other control means responsive to any increase in the length of the tape loop associated with said take up reel for increasing the speed of said second motor.

12. A high speed tape feeding mechanism comprising a reel, a tape moving means, a length of tape wound on said reel and coupled to said tape moving means, the tape forming a dependent loop between the reel and said tape moving means, rotatable means coupled to said reel to feed the tape from the reel to said tape moving means, sensing means responsive to the length of the tape loop, pulsing means activated by said sensing means and operative to urge said rotatable means in a reverse direction for a limited time interval, and dynamic braking means activated by said pulsing means and coupled to said rotatable means to further inhibit the rotation of said rotatable means.

13. A high speed tape feeding mechanism comprising a reel, a tape moving means, a length of tape wound on said reel and coupled to said tape moving means, the tape forming a dependent loop between the reel and said tape moving means, sensing means continuously responsive to the length of the tape loop, variable speed rotatable means fed by said sensing means and coupled to said reel to feed the tape from said reel to said tape moving means to provide a loop of substantially constant length, and dynamic electrical braking means activated by said sensing means at a predetermined loop length and coupled to said variable speed rotatable means to stop said variable speed rotatable means rapidly.

14. A high speed tape feeding mechanism comprising a reel, a tape moving means, a length of tape wound on said reel and coupled to said tape moving means, the tape forming a dependent loop between said reel and said tape moving means, sensing means continuously responsive to the length of the tape loop, variable speed rotatable means fed by said sensing means and coupled to said reel to feed the tape from said reel to said tape moving means to provide a loop of substantially constant length, pulsing means activated by said sensing means at a predetermined loop level and operative to urge said rotatable means in a reverse direction for a limited time interval, and dynamic braking means activated by said pulsing means and coupled to said rotatable means to further inhibit the rotation of said rotatable means.

15. A high speed tape feeding mechanism comprising a reel, a tape moving means, a length of tape wound on said reel and coupled to said tape moving means the tape forming a dependent loop between the reel and said moving means, electrically driven rotatable means coupled to said reel to feed the tape from the reel to said tape moving means, sensing means responsive to the length of the tape loop, pulsing means energized by said sensing means at a predetermined loop level to reverse the directional flow of the current through said rotatable means and effective to urge said rotatable means in a reverse direction for a limited time interval, and dynamic braking means activated by said pulsing means and coupled to said rotatable means to further inhibit the rotation of said rotatable means.

16. A high speed tape feeding mechanism comprising a reel, a tape moving means, a length of tape wound on said reel and coupled to said tape moving means, the tape forming a dependent loop between the reel and said tape moving means, rotatable means coupled to said reel to feed the tape from said tape moving means to the reel, sensing means responsive to the length of the tape loop, pulsing means activated by said sensing means and operative to urge said rotatable means in a reverse direction for a limited time interval, and dynamic braking means activated by said pulsing means and coupled to said rotatable means to further inhibit the rotation of said rotatable means.

17. A high speed tape feeding mechanism comprising a reel, a tape moving means, a length of tape wound on said reel and coupled to said tape moving means, the tape forming a dependent loop between the reel and said tape moving means, sensing means continuously responsive to the length of the tape loop, variable speed rotatable means fed by said sensing means and coupled to said reel to feed the tape from said tape moving means to said reel to provide a loop of substantially constant length, and dynamic electrical braking means activated by said sensing means at a predetermined loop length and coupled to said variable speed rotatable means to stop said variable speed rotatable means rapidly.

18. A high speed tape feeding machanism comprising a reel, a tape moving means, a length of tape wound on said reel and coupled to said tape moving means, the tape forming a dependent loop between said reel and said tape moving means, sensing means continuously responsive to the length of the tape loop, variable speed rotatable means fed by said sensing means and coupled to said reel to feed the tape from said tape moving means to said reel to provide a loop of substantially constant length, pulsing means activated by said sensing means at a predetermined loop level and operative to urge said rotatable means in a reverse direction for a limited time interval, and dynamic braking means activated by said pulsing means and coupled to said rotatable means to further inhibit the rotation of said rotatable means.

19. A high speed tape feeding mechanism comprising a reel, a tape moving means, a length of tape wound on said reel and coupled to said tape moving means, the tape forming a dependent loop between the reel and said moving means, electrically driven rotatable means coupled to said reel to feed the tape from said tape moving means to the reel, sensing means responsive to the length of the tape loop, pulsing means energized by said sensing means at a predetermined loop level to reverse the directional flow of the current through said rotatable means and effective to urge said rotatable means in a reverse direction for a limited time interval, and dynamic braking means activated by said pulsing means and coupled to said rotatable means to further inhibit the rotation of said rotatable means.

20. A tape drive system comprising reversible means for driving the tape in either of two opposite directions, tape storage means including a reel and reel drive means, means for establishing a loop in the tape between the tape drive means and the reel, means for generating a control signal indicative of the length of the loop, means for generating a reference signal, means dependent upon the direction of the reversible tape drive means for setting the reference signal to one of two different predetermined values depending on the direction of movement of the tape by the drive means, means for producing an error signal with changes in the control signal with relation to the reference signal, whereby the error signal is modified with changes in direction of the tape, and means for controlling the reel drive means in response to the error signal to maintain the correct loop length, the average length of the loop being determined by the reference signal.

21. A high speed tape feeding apparatus comprising a pair of reels between which the tape feeds, one of the reels of said pair operating as a supply reel while the other operates as a take up reel, said tape being formed with a loop associated with each reel, means to feed the tape at high speed from said supply reel to said take up reel, a first drive means being provided for rotating said supply reel at a high speed, a second drive means being provided for rotating said take up reel at a high speed, control means responsive to changes in the length of the tape loop associated with said supply reel for varying the speed of said first drive means, and other control means responsive to changes in the length of the tape loop associated with said take up reel for varying the speed of said second drive means, said control means being oppositely responsive to the same direction of change of their respective tape loops.

22. A high speed tape feeding mechanism comprising a reel, a tape moving means, a length of tape wound on said reel and coupled to said tape moving means, the tape forming a dependent loop between the reel and said tape moving means, rotatable means coupled to said reel to feed the tape from the reel to said tape moving means, sensing means responsive to the length of the tape loop, pulsing means activated by said sensing means and operative to urge said rotatable means in a reverse direction for a limited time interval, and electrical braking means activated by said pulsing means and coupled to said rotatable means to further inhibit the rotation of said rotatable means.

23. A high speed tape feeding mechanism comprising a reel, a tape moving means, a length of tape wound on said reel and coupled to said tape moving means, the tape forming a loop between the reel and said tape moving means, sensing means responsive to the length of the tape loop, variable speed rotatable means fed by said sensing means and coupled to said reel to feed the tape from said reel to said tape moving means to provide a loop of substantially constant length, and electrical braking means activated by said sensing means at a predetermined loop length and coupled to said variable speed rotatable means to stop said variable speed rotatable means rapidly.

24. A high speed tape feeding mechanism comprising a reel, a tape moving means, a length of tape wound on said reel and coupled to said tape moving means, the tape forming a loop between the reel and said tape moving means, sensing means responsive to the length of the tape loop, variable speed means fed by said sensing means and coupled to said reel to feed the tape from said tape moving means to said reel to provide a loop of substantially constant length, and braking means activated by said sensing means at a predetermined loop length and coupled to said variable speed means to stop said variable speed means rapidly.

References Cited by the Examiner

UNITED STATES PATENTS

| | | | |
|---|---|---|---|
| 2,302,049 | 11/42 | Parker et al. | 318—264 X |
| 2,379,132 | 6/45 | Cook | 242—75.52 X |
| 2,404,894 | 7/46 | Wills | 318—227 X |
| 2,417,427 | 3/47 | Massoneau | 317—127 |
| 2,432,876 | 12/47 | Formhals et al. | 242—75.52 |
| 2,437,064 | 3/48 | Andersen | 318—227 X |
| 2,529,065 | 11/50 | Agins | 318—227 X |
| 2,554,956 | 5/51 | Reeves | 318—227 |
| 2,644,887 | 7/53 | Wolfe | 250—27 |
| 2,655,598 | 10/53 | Eckert | 250—27 |
| 2,656,129 | 10/53 | De Turk et al. | 242—75.51 |
| 2,670,906 | 3/54 | Daniels et al. | 242—75.51 |

FOREIGN PATENTS

| | | |
|---|---|---|
| 296,728 | 8/29 | Great Britain. |

MERVIN STEIN, *Primary Examiner.*

HILLEL MARANS, MILTON O. HIRSHFIELD, ORIS L. RADER, JOSEPH P. STRIZAK, *Examiners.*

UNITED STATES PATENT OFFICE

CERTIFICATE OF CORRECTION

Patent No. 3,189,290 June 15, 1965

Herbert Frazer Welsh et al.

It is hereby certified that error appears in the above numbered patent requiring correction and that the said Letters Patent should read as corrected below.

Column 7, line 11, for "efficiently" read -- efficiency --; column 9, line 17, for "potential" read -- potentials --; column 14, line 4, for "clossing" read -- closing --; line 59, after "not" insert -- to --; column 15, line 52, for "poistion" read -- position --; column 28, line 66, for "excrusion" read -- excursion --; column 29, line 3, for "in" read -- on --; line 7, after "42" insert -- is --; column 31, line 21, after "signals" insert -- are --; line 37, for "integrator" read -- integrators --; column 33, line 48, for "slectively" read -- selectively --.

Signed and sealed this 21st day of December 1965.

(SEAL)
Attest:

ERNEST W. SWIDER
Attesting Officer

EDWARD J. BRENNER
Commissioner of Patents